United States Patent
Bullock et al.

(10) Patent No.: US 11,440,556 B2
(45) Date of Patent: Sep. 13, 2022

(54) TRAILED VEHICLES, MOBILE DEVICES, AND WEIGHT SENSING SYSTEM USER INTERFACES COMPRISED THEREIN

(71) Applicant: Thor Tech, Inc., Elkhart, IN (US)

(72) Inventors: Mark Bullock, Elkhart, IN (US); Jon Brock, Warsaw, IN (US)

(73) Assignee: Thor Tech, Inc., Elkhart, IN (US)

( * ) Notice: Subject to any disclaimer, the term of this patent is extended or adjusted under 35 U.S.C. 154(b) by 325 days.

(21) Appl. No.: 16/849,367

(22) Filed: Apr. 15, 2020

(65) Prior Publication Data

US 2021/0179116 A1      Jun. 17, 2021

Related U.S. Application Data

(60) Provisional application No. 62/947,275, filed on Dec. 12, 2019.

(51) Int. Cl.
*B60W 40/13*      (2012.01)
*B60D 1/48*      (2006.01)
(Continued)

(52) U.S. Cl.
CPC ............... *B60W 40/13* (2013.01); *B60D 1/48* (2013.01); *B60K 35/00* (2013.01); *B60W 50/14* (2013.01);
(Continued)

(58) Field of Classification Search
CPC .. B60W 40/13; B60W 50/14; B60W 2520/00; B60D 1/48; B60K 35/00;
(Continued)

(56) References Cited

U.S. PATENT DOCUMENTS 3,650,340 A      3/1972   Bradley
3,780,817 A     12/1973   Videon
(Continued)

FOREIGN PATENT DOCUMENTS

DE      7815093 U1    10/1978
EP      1607248 A1    12/2005
WO   2019056047 A1     3/2019

OTHER PUBLICATIONS

Smart Scale—Wireless Onboard Scale for Mechanical Suspension www.truckweight.com Accessed : 2016.
(Continued)

*Primary Examiner* — Gertrude Arthur Jeanglaude
(74) *Attorney, Agent, or Firm* — Dinsmore & Shohl LLP

(57) ABSTRACT

A trailed vehicle comprises a cargo area, a wheeled axle assembly supporting the cargo area, a hitch assembly configured to secure the trailed vehicle to a tow vehicle, and a weight sensing system comprising a weight processing module and a user interface. The weight processing module comprises a processor and non-transitory computer readable storage comprising instructions that, when executed by the processor, cause the weight processing module to execute an axle-specific vehicle weight determination, an axle-specific vehicle weight display presented at the user interface, a hitch-specific vehicle weight determination, a hitch-specific vehicle weight display presented at the user interface, a hitch-specific weight percentage determination, a hitch-specific weight percentage display presented at the user interface, a total weight determination, a total weight display presented at the user interface, an available cargo weight determination, and an available cargo weight display presented at the user interface. Additional embodiments are disclosed and claimed.

21 Claims, 12 Drawing Sheets

(51) Int. Cl.
  *B60K 35/00* (2006.01)
  *B60W 50/14* (2020.01)
  *B62D 21/09* (2006.01)
  *B62D 33/02* (2006.01)
  *B62D 33/04* (2006.01)

(52) U.S. Cl.
  CPC .............. *B62D 21/09* (2013.01); *B62D 33/02* (2013.01); *B62D 33/04* (2013.01); *B60K 2370/152* (2019.05); *B60K 2370/167* (2019.05); *B60W 2520/00* (2013.01)

(58) Field of Classification Search
  CPC ........ B60K 2370/167; B60K 2370/152; B62D 21/09; B62D 33/02; B62D 33/04
  USPC ......................................................... 701/124
  See application file for complete search history.

(56) References Cited

U.S. PATENT DOCUMENTS

| | | | |
|---|---|---|---|
| 3,878,908 A | | 4/1975 | Andersson et al. |
| 4,219,208 A | * | 8/1980 | Fuller .................... B62D 15/02 280/93.5 |
| 4,666,003 A | | 5/1987 | Reichow |
| 4,673,047 A | | 6/1987 | Harbour |
| 4,852,674 A | | 8/1989 | Gudat |
| 5,076,375 A | | 12/1991 | Dillon et al. |
| 5,230,392 A | | 7/1993 | Tremblay |
| 5,327,791 A | | 7/1994 | Walker |
| 5,391,843 A | | 2/1995 | Sato et al. |
| 5,410,109 A | | 4/1995 | Tarter et al. |
| 5,780,782 A | | 7/1998 | O'Dea |
| 5,811,738 A | | 9/1998 | Boyovich et al. |
| 5,880,409 A | | 3/1999 | Hartman |
| 6,025,563 A | | 2/2000 | Lesesky et al. |
| 6,118,083 A | | 9/2000 | Boyovich et al. |
| 6,449,582 B1 | | 9/2002 | Chaklader |
| 6,590,168 B2 | | 7/2003 | Kawaguchi et al. |
| 6,855,894 B1 | | 2/2005 | Van Seumeren |
| 7,398,668 B2 | | 7/2008 | Nordmeyer |
| 7,572,988 B1 | | 8/2009 | Morton et al. |
| 8,570,183 B2 | | 10/2013 | Corrado |
| 8,767,379 B2 | | 1/2014 | Whitaker |
| 9,072,214 B2 | * | 7/2015 | Connors ................. A01B 73/00 |
| 9,469,342 B2 | * | 10/2016 | Mackin .................... B62D 7/06 |
| 10,173,689 B1 | | 1/2019 | Bullock et al. |
| 10,300,928 B2 | * | 5/2019 | Trageser ......... B60W 30/18036 |
| 2006/0124364 A1 | | 6/2006 | Loewen et al. |
| 2007/0181350 A1 | | 8/2007 | Kranz et al. |
| 2008/0262774 A1 | | 10/2008 | Fasig et al. |
| 2014/0000969 A1 | | 1/2014 | Carrutheres et al. |
| 2015/0019165 A1 | | 1/2015 | Theuss et al. |
| 2019/0225230 A1 | | 7/2019 | Bullock et al. |

OTHER PUBLICATIONS

Fernando et al., "Truck Instrumentation for Dynamic Load Measurement", Published: Dec. 2007, Texas Transportation Institute.
Davis et al., "Suspension testing of 3 heavy vehicles—methodology and preliminary frequency analysis", www.mainroads.qld.gov.au, 2008.
49 C.F.R Section 571.3 "Definitions" Oct. 2010.
International Search Report and Written Opinion relating to PCT/US2019/013911, dated Apr. 8, 2019.
European Search Report pertaining to Application No. EP20213507.5 dated May 3, 2021, 8 pgs.

* cited by examiner

TRAILED VEHICLES, MOBILE DEVICES, AND WEIGHT SENSING SYSTEM USER INTERFACES COMPRISED THEREIN

CROSS-REFERENCE TO RELATED APPLICATIONS

This application claims the benefit of U.S. Provisional Application No. 62/947,275, filed Dec. 12, 2019, and entitled TRAILED VEHICLES, MOBILE DEVICES, AND WEIGHT SENSING SYSTEM USER INTERFACES COMPRISED THEREIN, the entire contents of which are incorporated herein by reference.

BACKGROUND

The present disclosure relates to recreational vehicles, utility trailers, and other similar trailed vehicles. More particularly, the present disclosure relates to recreational vehicles and utility trailers where it may be advantageous to monitor the loaded weight of the trailed vehicle. Recreational vehicles encompassed by the present disclosure include trailer-type recreational vehicles, which include fifth wheel trailers and other types of towable campers, toy haulers, etc. Recreational vehicles encompassed by the present disclosure also include motored recreational vehicles, like motor homes and other vehicles with their own motor and drive train. Utility trailers encompassed by the present disclosure include single or double-axle enclosed or open utility trailers that are designed to be hauled using a personal automobile or truck.

BRIEF SUMMARY

In accordance with one embodiment of the present disclosure, a trailed vehicle comprises a cargo area, a wheeled axle assembly supporting the cargo area, a hitch assembly configured to secure the trailed vehicle to a tow vehicle, and a weight sensing system. The weight sensing system comprises weight sensing components associated with the wheeled axle assembly and the hitch assembly, a weight processing module communicatively coupled to the weight-sensing components, and a user interface. The weight processing module comprises a processor and non-transitory computer readable storage, the non-transitory computer readable storage comprising instructions that, when executed by the processor, cause the weight processing module to cooperate with the weight sensing components and the user interface to execute weight determination and display operations. The weight determination and display operations executed by the weight processing module comprise an axle-specific vehicle weight determination, an axle-specific vehicle weight display presented at the user interface, a hitch-specific vehicle weight determination, a hitch-specific vehicle weight display presented at the user interface, a hitch-specific weight percentage determination, a hitch-specific weight percentage display presented at the user interface, a total weight determination, a total weight display presented at the user interface, an available cargo weight determination, and an available cargo weight display presented at the user interface. The axle-specific vehicle weight display comprises an excess axle-specific vehicle weight alert that is triggered when the axle-specific vehicle weight determination is above an axle-specific reference weight. The hitch-specific weight percentage determination represents the hitch-specific vehicle weight in relation to a hitch-specific reference weight, and the hitch-specific weight percentage display comprises an excess hitch-specific weight percentage alert that is triggered when the hitch-specific weight percentage determination is above or below an acceptable relative weight range at the hitch assembly. The total weight determination represents a combination comprising at least the hitch-specific vehicle weight and the axle-specific vehicle weight, and the total weight display comprises an excess total weight alert that is triggered when the total weight determination is above a GVWR of the trailed vehicle. The available cargo weight determination represents a difference between the GVWR of the trailed vehicle and the total weight, and the available cargo weight display comprises an excess cargo weight alert that is triggered when the available cargo weight is at or below zero.

In accordance with another embodiment of the present disclosure, a mobile device comprises a communication interface, a user interface, and a user interface controller. The communication interface implements vehicle weight acquisition of vehicle weight determinations executed by a weight processing module of a trailed vehicle comprising a cargo area, a wheeled axle assembly supporting the cargo area, a hitch assembly configured to secure the trailed vehicle to a tow vehicle, and a weight sensing system including the weight processing module and weight sensing components that are associated with the wheeled axle assembly and the hitch assembly and that are communicatively coupled to the weight processing module. The user interface controller comprises a processor and non-transitory computer readable storage having instructions that, when executed by the processor, cause the user interface controller to cooperate with the communication interface and the user interface to execute user interface controller operations. The user interface controller operations executed by the user interface controller comprise an axle-specific vehicle weight acquisition via the communication interface, an axle-specific vehicle weight display at the user interface, a hitch-specific vehicle weight acquisition via the communication interface, a hitch-specific vehicle weight display at the user interface, a hitch-specific weight percentage display at the user interface, a total weight acquisition via the communication interface, a total weight display at the user interface, an available cargo weight acquisition via the communication interface, and an available cargo weight display at the user interface. The axle-specific vehicle weight display comprises an excess axle-specific vehicle weight alert that is triggered when the axle-specific vehicle weight acquisition is above an axle-specific reference weight. The hitch-specific weight percentage display comprises both a hitch-specific weight percentage acquisition representing the hitch-specific vehicle weight in relation to a hitch-specific reference weight, and an excess hitch-specific weight percentage alert that is triggered when the hitch-specific weight percentage acquisition is above or below an acceptable relative weight range at the hitch assembly. The total weight acquisition represents a combination comprising at least the axle-specific vehicle weight and the hitch-specific vehicle weight, and the total weight display comprises an excess total weight alert that is triggered when the total weight acquisition is above a GVWR of the trailed vehicle. The available cargo weight acquisition represents a difference between the GVWR of the trailed vehicle and the total weight, and the available cargo weight display comprises an excess cargo weight alert that is triggered when the available cargo weight acquisition is at or below zero.

In accordance with a further embodiment of the present disclosure, a trailed vehicle comprises a cargo area, a wheeled axle assembly supporting the cargo area, a hitch assembly configured to secure the trailed vehicle to a tow vehicle, and a weight sensing system. The weight sensing system comprises weight sensing components associated with the wheeled axle assembly and the hitch assembly, a weight processing module communicatively coupled to the weight-sensing components, and a user interface. The weight processing module comprises a processor and non-transitory computer readable storage, the non-transitory computer readable storage comprising instructions that, when executed by the processor, cause the weight processing module to cooperate with the weight sensing components and the user interface to execute weight determination and display operations. The user interface comprises an axle-specific vehicle weight display element, a hitch-specific weight display element, a total weight display element of the user interface, and an available cargo weight display element. The weight determination and display operations executed by the weight processing module comprise an axle-specific vehicle weight determination, a hitch-specific vehicle weight determination, a hitch-specific weight percentage determination, a total weight determination, and an available cargo weight determination. The weight determination and display operations executed by the weight processing module further comprise an axle-specific vehicle weight display presented at the user interface, a hitch-specific vehicle weight display presented at the user interface, a hitch-specific weight percentage display presented at the user interface, a total weight display presented at the user interface, and an available cargo weight display presented at the user interface. The axle-specific vehicle weight display comprises an excess axle-specific vehicle weight alert that is triggered when the axle-specific vehicle weight determination is above an axle-specific reference weight, and the axle-specific vehicle weight display element accommodates a visual overlay of the axle-specific vehicle weight and the excess axle-specific vehicle weight alert. The hitch-specific weight percentage determination represents the hitch-specific vehicle weight in relation to a hitch-specific reference weight, the hitch-specific weight percentage display comprises an excess hitch-specific weight percentage alert that is triggered when the hitch-specific weight percentage determination is above or below an acceptable relative weight range at the hitch assembly, and the hitch-specific weight display element accommodates a visual overlay of the hitch-specific vehicle weight, the hitch-specific weight percentage, and the excess hitch-specific vehicle weight alert. The total weight determination represents a combination comprising at least the hitch-specific vehicle weight and the axle-specific vehicle weight, the total weight display comprises an excess total weight alert that is triggered when the total weight determination is above a GVWR of the trailed vehicle, and the total weight display element accommodates a visual overlay of the total weight and the excess total weight alert. The available cargo weight determination represents a difference between the GVWR of the trailed vehicle and the total weight, the available cargo weight display comprises an excess cargo weight alert that is triggered when the available cargo weight is at or below zero, and the available cargo weight display element accommodates a visual overlay of the available cargo weight and the excess cargo weight alert.

Although the concepts of the present disclosure are described herein with primary reference to fifth wheel trailers, it is contemplated that the concepts will enjoy applicability to any trailed vehicle.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
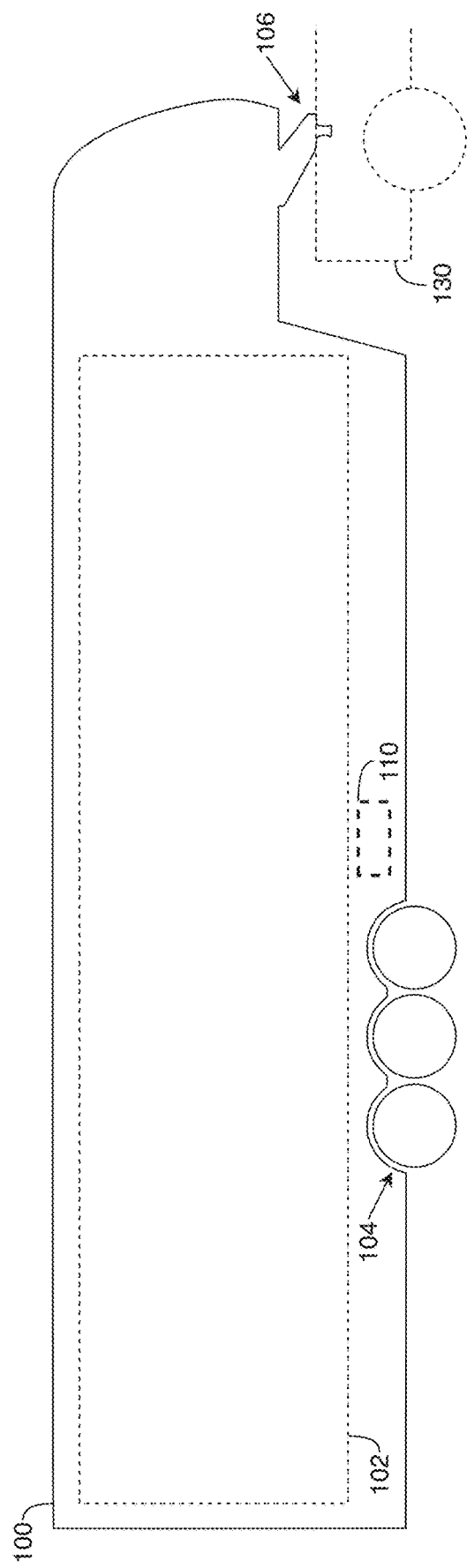
FIG. 1 illustrates a trailed vehicle according to one or more embodiments illustrated and described herein, presented in the non-limiting context of a fifth-wheel, trailer-type recreational vehicle.

FIG. 1 illustrates a trailed vehicle according to one or more embodiments illustrated and described herein, presented in the non-limiting context of a fifth-wheel, trailer-type recreational vehicle (RV). As shown, a trailed vehicle 100 comprises a cargo area 102, a wheeled axle assembly 104 supporting the cargo area, a hitch assembly 106 configured to secure the trailed vehicle 100 to a tow vehicle 130, and a weight sensing system 110. It should be understood that the trailed vehicle 100 may include different and/or additional components.

Trailed vehicle 100 may take the form of an RV, a utility trailer, a fifth wheel trailer, or any other trailed vehicle. For example, the trailed vehicle 100 could take the form of a fifth wheel camper, a towable camper, a toy hauler, any other trailer-type RV, or a combination of these, among many other possibilities. As another example, the trailed vehicle 100 could take the form of a single, double, or triple axle enclosed or open utility trailer.

Cargo area 102 may include a living area with one or more rooms—for instance, to provide living area occupants with a place to sleep, eat, or relax during stops along a road trip with trailed vehicle 100. As an example, the cargo area may accommodate furnishings such as tables and benches, appliances such as microwaves and televisions, and fixtures such as doors and ceiling lights, among numerous other examples. As another example, the cargo area may provide for storage of provisions such as food, linens, clothes, and other supplies. Cargo area 102 could take other forms as well, and in some embodiments, the cargo area may not include a living area.

Wheeled axle assembly 104 may include one or more axles, wheels, tires, springs, or any combination of these or other wheeled-axle assembly components, and hitch assembly 106 may take the form of a fifth-wheel hitch assembly, a receiver hitch assembly (e.g., for a trailer hitch or bumper hitch), another hitch assembly, or a combination of these, as examples. Tow vehicle 130 could include a trailer hitch, and hitch assembly 106 could be connected to the trailer hitch of the tow vehicle—for instance, via a coupling installed at the hitch assembly 106, at the trailer hitch of the tow vehicle, or both, among other possibilities. Tow vehicle 130 may take the form of a pickup truck, a sport utility vehicle (SUV), or any other tow vehicle.

Figure 2:
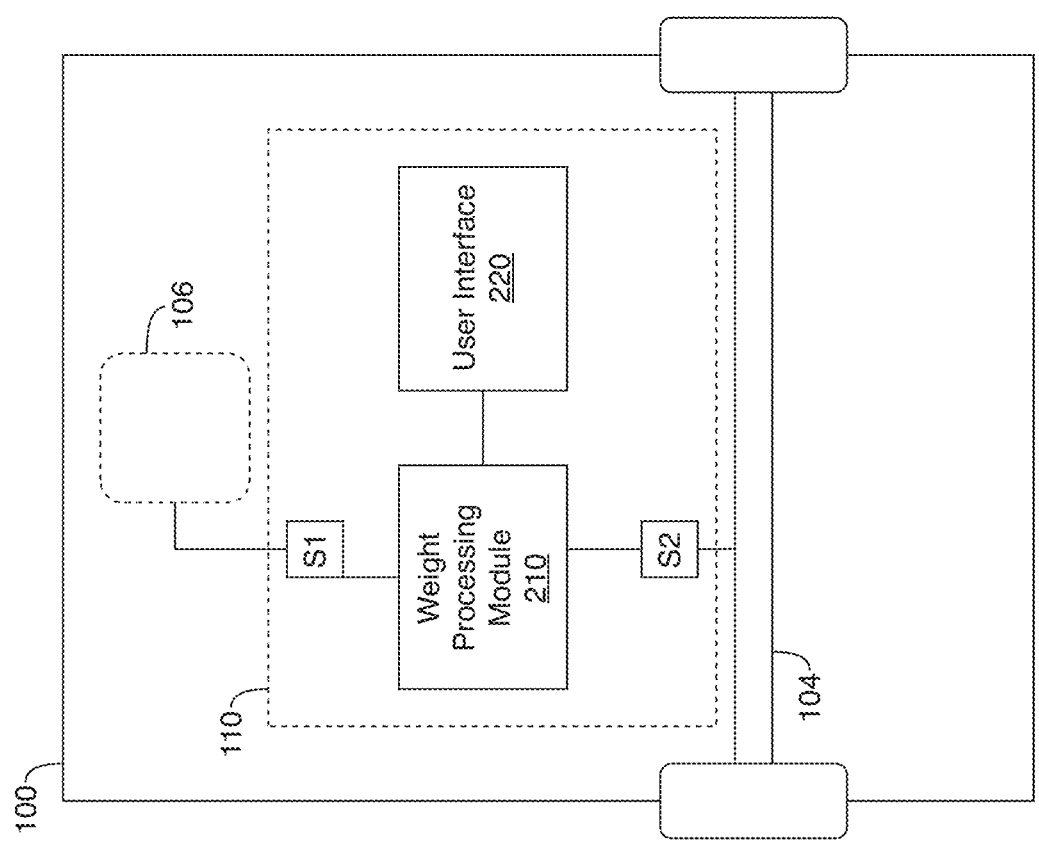
FIG. 2 illustrates a weight sensing system for a trailed vehicle, according to one or more embodiments illustrated and described herein.

FIG. 2 illustrates a weight sensing system, according to one or more embodiments illustrated and described herein. As shown, weight sensing system 110 comprises weight sensing components S1 and S2 associated with wheeled axle assembly 104 and hitch assembly 106, a weight processing module 210 communicatively coupled to weight-sensing components S1 and S2, and a user interface 220. Weight processing module 210 may be further communicatively coupled to user interface 220 (e.g., coupled to respective components of the user interface), and components of user interface 220 may be mutually coupled—e.g., via a communication bus. It should be understood that the weight sensing system 110 may include different and/or additional components.

Weight sensing components S1 and S2 may each generate raw vehicle weight signals, which may be used by weight processing module 210 to execute one or more weight determination operations. The weight sensing components could take the form of one or more respective load-bearing component strain gauges, displacement gauges, pressure gauges, or any combination of these or other weight sensing components.

Weight processing module 210 comprises a processor and non-transitory computer readable storage, the non-transitory computer readable storage comprising instructions that, when executed by the processor, cause the weight processing module 210 to cooperate with the weight sensing components S1 and S2 and the user interface 220 to execute weight determination and display operations. A "module," as used herein, can be a stand-alone programmable controller or a component of a programmable controller that integrates the functionality of the module with other functionality, among other possibilities. Those of skill in the art will appreciate that weight processing module 210 may include different and/or additional components. Moreover, the storage of weight processing module 210 could comprise additional data, such as data indicating an axle-specific reference weight $W_{RA}$, a hitch-specific reference weight $W_{RH}$, a gross vehicle weight rating (GVWR) of trailed vehicle 100, a gross axle weight rating (GAWR) of trailed vehicle 100 (e.g., a combination of respective GAWRs of one or more axles of wheeled axle assembly 104), or any combination of these or other data.

For the purposes of the present disclosure, it is noted that any given weight "determination" may involve utilizing signals from weight sensing components S1 and S2 to execute the respective weight determination operation, and could further (but need not) include the use of data stored in weight processing module 210 and/or use of a suitable calculation algorithm.

User interface 220 may be configured to output information to a user and/or receive input from the user. Output could be provided via a display such as a touchscreen display, a loudspeaker, a haptic actuator such as a linear resonant actuator (LRA) or an eccentric rotating mass (ERM) actuator, and/or any other component integrated with and/or communicatively connected to the user interface 220. Additionally, input might be achieved via the touchscreen display, one or more buttons, a microphone, and/or any other component integrated with and/or communicatively connected to the user interface 220. Some components may provide for both input and output, such as the aforementioned touchscreen display. User interface 220 (such as one or more components of the user interface 220) may be mounted to the trailed vehicle 100. For instance, the user interface 220 may be mounted in an interior of the trailed vehicle 100, such as an interior of the cargo area 102. As examples, the user interface 220 could be positioned near a doorway of the cargo area 102, within an enclosure (e.g., a cabinet) of the cargo area 102, or at another location in the cargo area 102. As another possibility, the user interface 220 could be mounted to an exterior of the trailed vehicle 100—for instance, near the hitch assembly 106. Other locations of the trailed vehicle 100 at which the user interface 220 could be mounted are possible as well.

Figure 3:
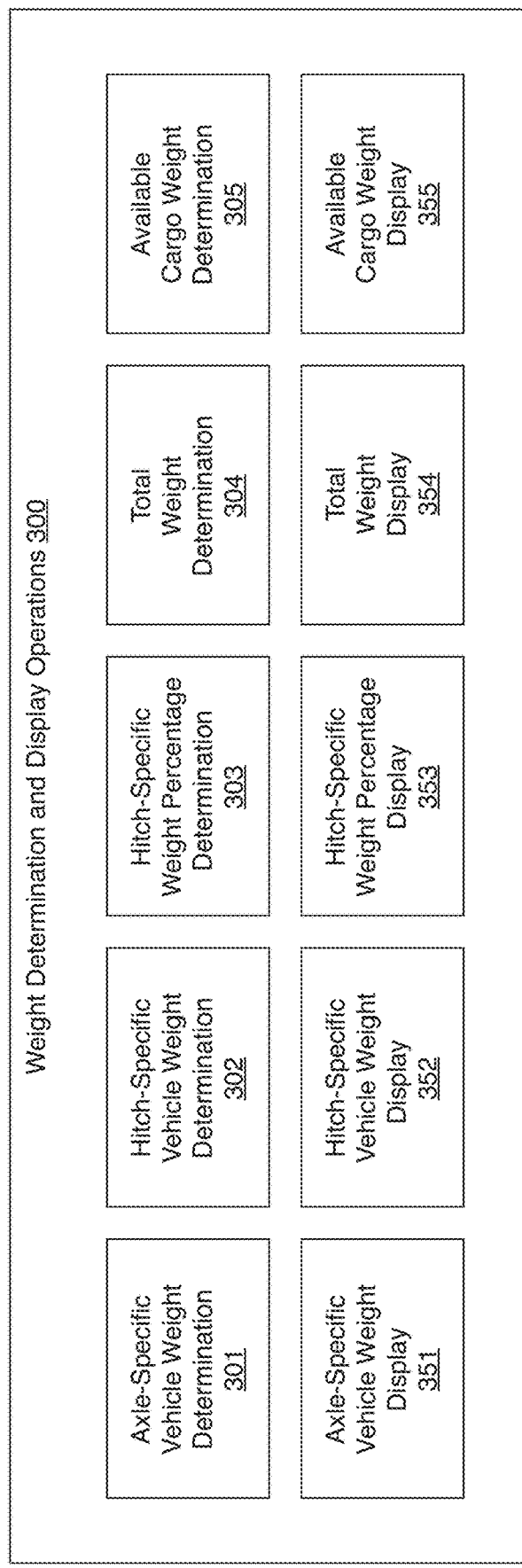
FIG. 3 depicts weight determination and display operations executed by a weight processing module, according to one or more embodiments illustrated and described herein.

FIG. 3 depicts weight determination and display operations executed by a weight processing module, according to one or more embodiments illustrated and described herein. As shown, weight determination and display operations 300 executed by weight processing module 210 comprise an axle-specific vehicle weight ($W_A$) determination 301, a hitch-specific vehicle weight ($W_H$) determination 302, a hitch-specific weight percentage ($W_{H\%}$) determination 303, a total weight (W) determination 304, and an available cargo weight ($W_{\tilde{C}}$) determination 305. Those of skill in the art will appreciate that weight determination and display operations 300 may include different and/or additional operations.

Axle-specific vehicle weight determination 301 may represent a weight of trailed vehicle 100 at wheeled axle assembly 104. As one possibility, axle-specific vehicle weight $W_A$ may reflect a sprung weight $W_S$ of trailed vehicle 100, which in turn may comprise at least part of a weight of trailed vehicle 100 supported by a suspension of wheeled axle assembly 104. Axle-specific vehicle weight $W_A$ could exclude or include a weight of at least part of wheeled axle assembly 104 itself. For instance, an unsprung weight $W_U$ of trailed vehicle 100 may comprise at least part of a weight of trailed vehicle 100 not supported by a suspension of wheeled axle assembly 104—such as one or more wheels and/or axles not supported by the suspension—and axle-specific vehicle weight $W_A$ could exclude or include this unsprung weight. In an example, axle-specific vehicle weight $W_A$ reflects sprung weight $W_S$ of trailed vehicle 100, but excludes unsprung weight $W_U$ of the trailed vehicle. In a further example, axle-specific vehicle weight $W_A$ reflects a combination of sprung weight $W_S$ of trailed vehicle 100 and unsprung weight $W_U$ of the trailed vehicle. As another possibility, axle-specific vehicle weight $W_A$ may reflect a combination of a pre-loaded weight $W_0$ of trailed vehicle 100 and a cargo weight $W_C$ carried by trailed vehicle 100, at wheeled axle assembly 104. Pre-loaded weight $W_0$ is discussed in additional detail below.

Hitch-specific vehicle weight determination 302 may represent a weight of trailed vehicle 100 at hitch assembly 106.

As an example, hitch-specific vehicle weight $W_H$ may reflect a combination, at hitch assembly 106, of pre-loaded weight $W_O$ and cargo weight $W_C$.

Hitch-specific weight percentage determination 303 represents hitch-specific vehicle weight $W_H$ in relation to a hitch-specific reference weight $W_{RH}$, described in additional detail below. For instance, hitch-specific weight percentage determination 303 may represent a ratio $$W_{H\%} = \frac{W_H}{W_{RH}}$$

of hitch-specific vehicle weight $W_H$ to hitch-specific reference weight $W_{RH}$.

Total weight determination 304 represents a combination comprising at least hitch-specific vehicle weight $W_H$ and axle-specific vehicle weight $W_A$. For instance, total weight determination 304 may represent a sum $W=W_H+W_A$ of at least hitch-specific vehicle weight $W_H$ and axle-specific vehicle weight $W_A$. As an example, total weight determination 304 may represent a combination comprising at least hitch-specific vehicle weight $W_H$, axle-specific vehicle weight $W_A$, and an unsprung weight $W_U$ of trailed vehicle 100—for example, a sum $W=W_H+W_A+W_U$. As a further example, total weight determination 304 may represent a combination comprising at least sprung weight $W_S$ of trailed vehicle 100 and unsprung weight $W_U$ of the trailed vehicle. For instance, in an embodiment, total weight determination 304 comprises a sprung weight determination and an unsprung weight determination. Weight sensing component S1 or S2, another weight sensing component, or a combination of these are configured to generate signals reflecting sprung weight $W_S$ of trailed vehicle 100, and the sprung weight determination utilizes these generated signals. The unsprung weight determination utilizes data stored in the storage of weight processing module 210, such as data indicating the unsprung weight $W_U$.

Available cargo weight determination 305 may represent a difference $W_{\hat{C}}=GVWR-W$ between the GVWR of trailed vehicle 100 and total weight W.

Hitch-specific reference weight $W_{RH}$ is total weight W of trailed vehicle 100, according to an embodiment of the disclosure. In another embodiment, hitch-specific reference weight $W_{RH}$ is pre-loaded weight $W_O$ of trailed vehicle 100. Pre-loaded weight $W_O$ may represent the weight of trailed vehicle 100 including, for example, appliances, furniture, lighting, and other interior or exterior installed fixtures. Pre-loaded weight $W_O$ could also include provisions such as the weight of coolants, engine oil, and gasoline in a full fuel tank of trailed vehicle 100, though in some embodiments, pre-loaded weight $W_O$ may exclude these provisions. It is contemplated that, in some instances, pre-loaded weight $W_O$ may also accommodate for supplies such as bedding, utensils, safety equipment, propane fuel or other fuel, fresh water, or any combination of these or other supplies that may not be fixtures, but may nevertheless be commonly associated with a pre-loaded trailed vehicle. Pre-loaded weight $W_O$ could include a curb weight of trailed vehicle 100 or a dry weight of the trailed vehicle, as will be understood by those of skill in the art. In a further embodiment, hitch-specific reference weight $W_{RH}$ is axle-specific vehicle weight $W_A$ of trailed vehicle 100. Other examples of hitch-specific reference weight $W_{RH}$ are possible as well without departing from the scope of the disclosure.

In some embodiments, weight determination and display operations 300 executed by weight processing module 210 further comprise a reference weight acquisition. The reference weight acquisition may take the form of (or include) total weight determination 304, axle-specific vehicle weight determination 301, hitch-specific vehicle weight determination 302, and/or a combination of these, as examples. The reference weight acquisition could include, for instance, a reference weight acquisition from a data storage of weight processing module 210, such as (but not limited to) the non-transitory computer readable storage of weight processing module 210 that includes instructions executable by the processor of the weight processing module. As another possibility, the reference weight acquisition could include a reference weight acquisition based on user input at user interface 220. In an example, the reference weight acquisition reflects permanent changes to the GVWR, GAWR, unsprung weight $W_U$, a pre-loaded weight $W_O$, and/or another weight of trailed vehicle 100—perhaps as a result of a calibration of weight sensing components S1 and S2 and/or a modification to the trailed vehicle, such as a change of one or more tires or components of wheeled axle assembly 104. In such a case, the reference weight may be acquired based on user input of the reference weight (or a modification of the reference weight) at user interface 220. The reference weight (acquired based on the user input) could then be stored in a data storage of weight processing module 210. As a further possibility, the reference weight acquisition could include a combination of these, such as (for instance) reference weight acquisition based on user input at user interface 220, a reference weight storage of the (user input) reference weight in a data storage of weight processing module 210, and a subsequent reference weight acquisition of the reference weight in the data storage. Other examples of the reference weight acquisition are possible as well without departing from the scope of the disclosure.

Weight processing module 210 may execute the respective weight determinations periodically (at regular intervals), in response to input received via user interface 220, or a combination of these, among numerous other examples. Additionally or alternatively, weight processing module 210 may store any of the respective weight determinations (e.g., data representing the weight determinations) in a data storage for subsequent use by the weight processing module, among other possibilities.

As shown in FIG. 3, weight determination and display operations 300 executed by the weight processing module 210 further comprise an axle-specific vehicle weight display 351 presented at the user interface 220, a hitch-specific vehicle weight display 352 presented at the user interface 220, a hitch-specific weight percentage display 353 presented at the user interface 220, a total weight display 354 presented at the user interface 220, and an available cargo weight display 355 presented at the user interface 220. Visual examples of these display operations are depicted in subsequent figures.

Figure 4:
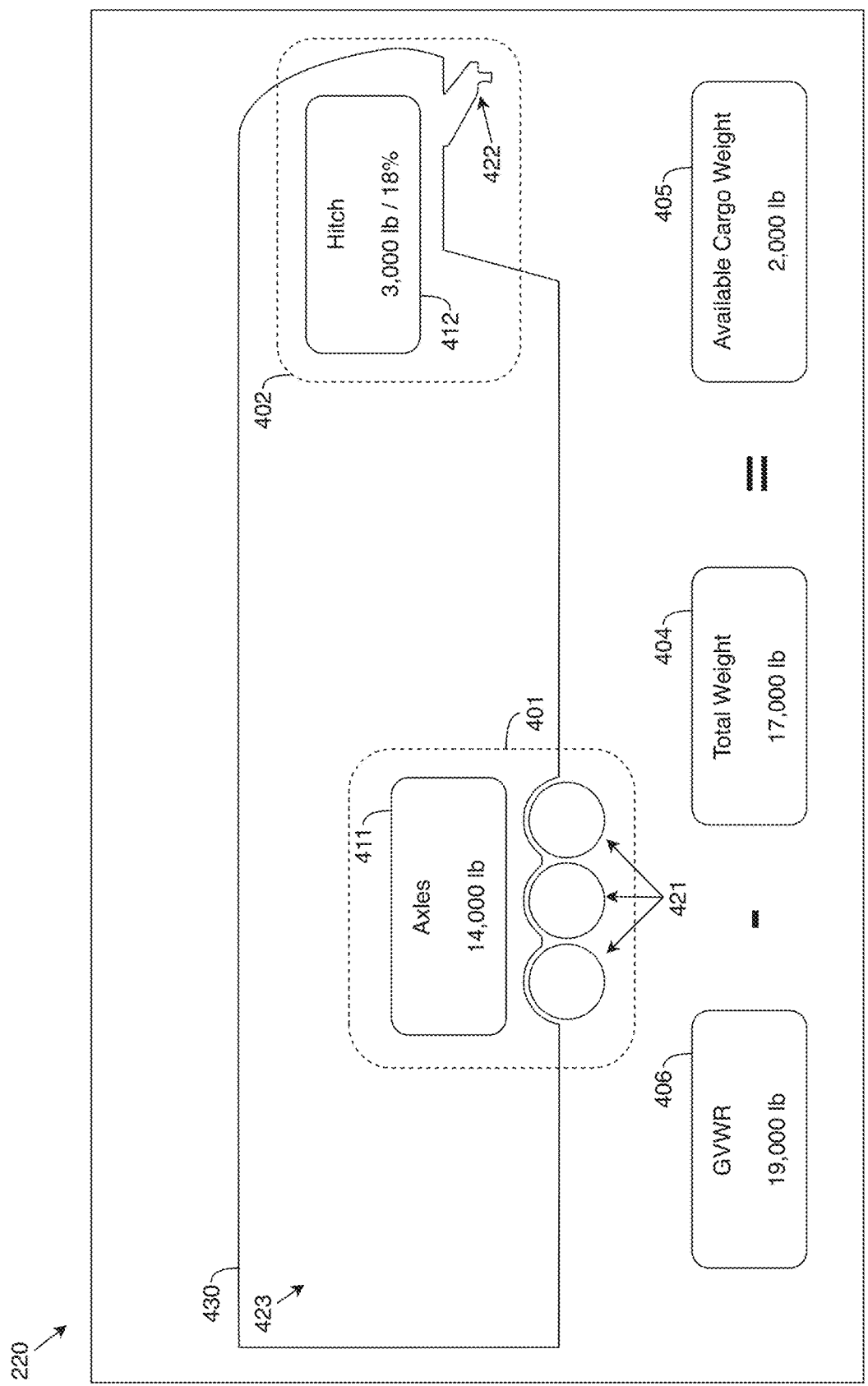
FIG. 4 depicts a weight sensing system user interface, according to one or more embodiments illustrated and described herein.

FIG. 4 depicts a presentation of a user interface, according to one or more embodiments illustrated and described herein. As shown, user interface 220 includes an axle-specific vehicle weight display element 401, a hitch-specific weight display element 402, a total weight display element 404, an available cargo weight display element 405, and a GVWR display element 406. Additionally, user interface 220 includes a display element in the form of a vehicle representation 430 of trailed vehicle 100. Those of skill in the art will appreciate that user interface 220 may include different and/or additional display element—for example, in some embodiments, user interface 220 may not include GVWR display element 406 or vehicle representation 430.

In the embodiment illustrated in FIG. 4, axle-specific vehicle weight display element 401 accommodates a visual overlay of axle-specific vehicle weight $W_A$, and hitch-specific weight display element 402 accommodates a visual overlay of hitch-specific vehicle weight $W_H$ and hitch-specific weight percentage $W_{H\%}$. Additionally, total weight display element 404 accommodates a visual overlay of total weight W, and available cargo weight display element 405 accommodates a visual overlay of available cargo weight $W_{\hat{C}}$. Also, GVWR display element 406 accommodates a visual overlay of a GVWR of trailed vehicle 100.

More particularly, FIG. 4 depicts examples of axle-specific vehicle weight display element 401 accommodating a visual overlay of an axle-specific vehicle weight $W_A$ of 14,000 lb, and hitch-specific weight display element 402 accommodating a visual overlay of a hitch-specific vehicle weight $W_H$ of 3,000 lb and a hitch-specific weight percentage $W_{H\%}$ of 18%. Total weight display element 404 accommodates a visual overlay of a total weight W of 17,000 lb, and available cargo weight display element 405 accommodates a visual overlay of an available cargo weight $W_{\hat{C}}$ of 2,000 lb. Additionally, GVWR display element 406 accommodates a visual overlay of a GVWR of 19,000 lb.

It should be understood that any of the display elements of user interface 220 may accommodate different and/or additional visual overlays. For instance, user interface 220 could include an additional display element, and instead of hitch-specific weight display element 402 accommodating the visual overlay of hitch-specific vehicle weight $W_H$, the additional display element could accommodate this visual overlay. As another possibility, user interface 220 may not include total weight display element 404, and another display element (such as available cargo weight display element 405) could accommodate this visual overlay, or none of the display elements may accommodate this visual overlay. Numerous other variations are possible as well. Moreover, it should be understood that the axle-specific vehicle weight $W_A$, the hitch-specific vehicle weight $W_H$, the hitch-specific weight percentage $W_{H\%}$, the total weight W, the available cargo weight $W_{\hat{C}}$, and the GVWR shown in FIG. 4 are merely examples, and that any of these could be any other weight without from the scope of the disclosure.

Vehicle representation 430 may include respective representations for any one or more components of trailed vehicle 100, and the relative locations of the representations of the components in vehicle representation 430 may reflect the relative locations of the respective components of trailed vehicle 100. For instance, in the embodiment of FIG. 4, vehicle representation 430 includes a wheeled axle assembly representation 421, a hitch assembly representation 422, and a cargo area representation 423, the relative locations of which reflect the respective locations of cargo area 102, wheeled axle assembly 104, and hitch assembly 106 at trailed vehicle 100, respectively. Those of skill in the art will appreciate that vehicle representation 430 may include representations of different and/or additional component of trailed vehicle 100.

Any one or more of the display elements of user interface 220 could in turn include a respective display element. For instance, as shown in FIG. 4, axle-specific vehicle weight display element 401 includes a display element 411 in the shape of a rounded rectangle, and hitch-specific weight display element 402 includes a display element 412, also in the shape of a rounded rectangle. As another possibility, one or more of the display elements of user interface 220 could take the form of (or include) a representation of one or more components of trailed vehicle 100. For instance, as shown in FIG. 4, axle-specific vehicle weight display element 401 includes wheeled axle assembly representation 421, and hitch-specific weight display element 402 includes hitch assembly representation 422. Moreover, as may be recognized from the above description, any one or more of the display elements could include multiple display elements. For example, in the embodiment of FIG. 4, axle-specific vehicle weight display element 401 includes both display element 411 and wheeled axle assembly representation 421, and hitch-specific weight display element 402 includes both display element 412 and hitch assembly representation 422. However, it will be appreciated that other variations are possible as well without departing from the scope of the disclosure.

Among weight determination and display operations 300, one or more of the display operations could include respective excess weight alerts. For instance, a given display operation could include an excess weigh alert that is triggered when axle-specific vehicle weight determination 301 is above the GAWR or the GVWR of trailed vehicle 100, among other possibilities.

Figure 5:
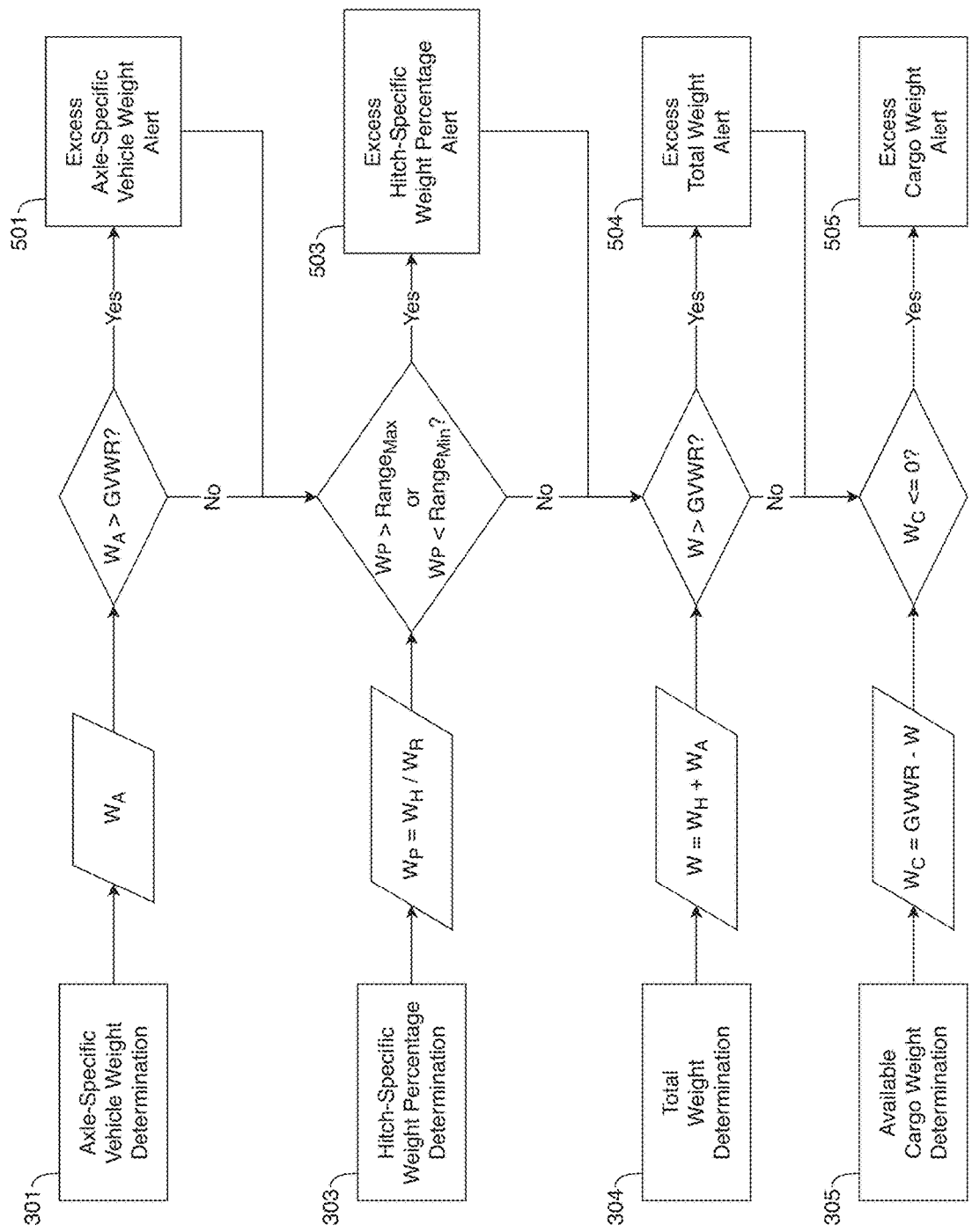
FIG. 5 depicts several examples of excess weight alerts in a weight sensing system user interface, according to one or more embodiments illustrated and described herein.

FIG. 5 depicts several examples of excess weight alerts, according to one or more embodiments illustrated and described herein. More particularly, FIG. 5 shows an excess axle-specific vehicle weight alert 501, an excess hitch-specific weight percentage alert 503, an excess total weight alert 504, and an excess cargo weight alert 505. For ease of understanding, each of these are at times referred to generically as a respective excess weight alert.

As shown in FIG. 5, excess axle-specific vehicle weight alert 501 is triggered when axle-specific vehicle weight $W_A$ determination 301 is above axle-specific reference weight $W_{RA}$ which could be the GAWR of trailed vehicle 100 and/or the GVWR of the trailed vehicle, as examples. As also shown, excess hitch-specific weight percentage alert 503 is triggered when hitch-specific weight percentage $W_{H\%}$ determination 303 is above or below an acceptable relative weight range $Range_{Max}$–$Range_{Min}$ at hitch assembly 106. Further shown, excess total weight alert 504 is triggered when total weight W determination 304 is above the GVWR of trailed vehicle 100, and as shown, excess cargo weight alert 505 is triggered when available cargo weight $W_{\hat{C}}$ is at or below zero.

In an embodiment, axle-specific vehicle weight display 351 comprises the excess axle-specific vehicle weight alert 501, hitch-specific weight percentage display 353 comprises the excess hitch-specific weight percentage alert 503, total weight display 354 comprises the excess total weight alert 504, and available cargo weight display 355 comprises the excess cargo weight alert 505. Those of skill in the art will appreciate that different and/or additional display operations (among weight determination and display operations 300) could include respective excess weight alerts, and that any of the excess weight alerts could take other forms as well.

Figure 6A:
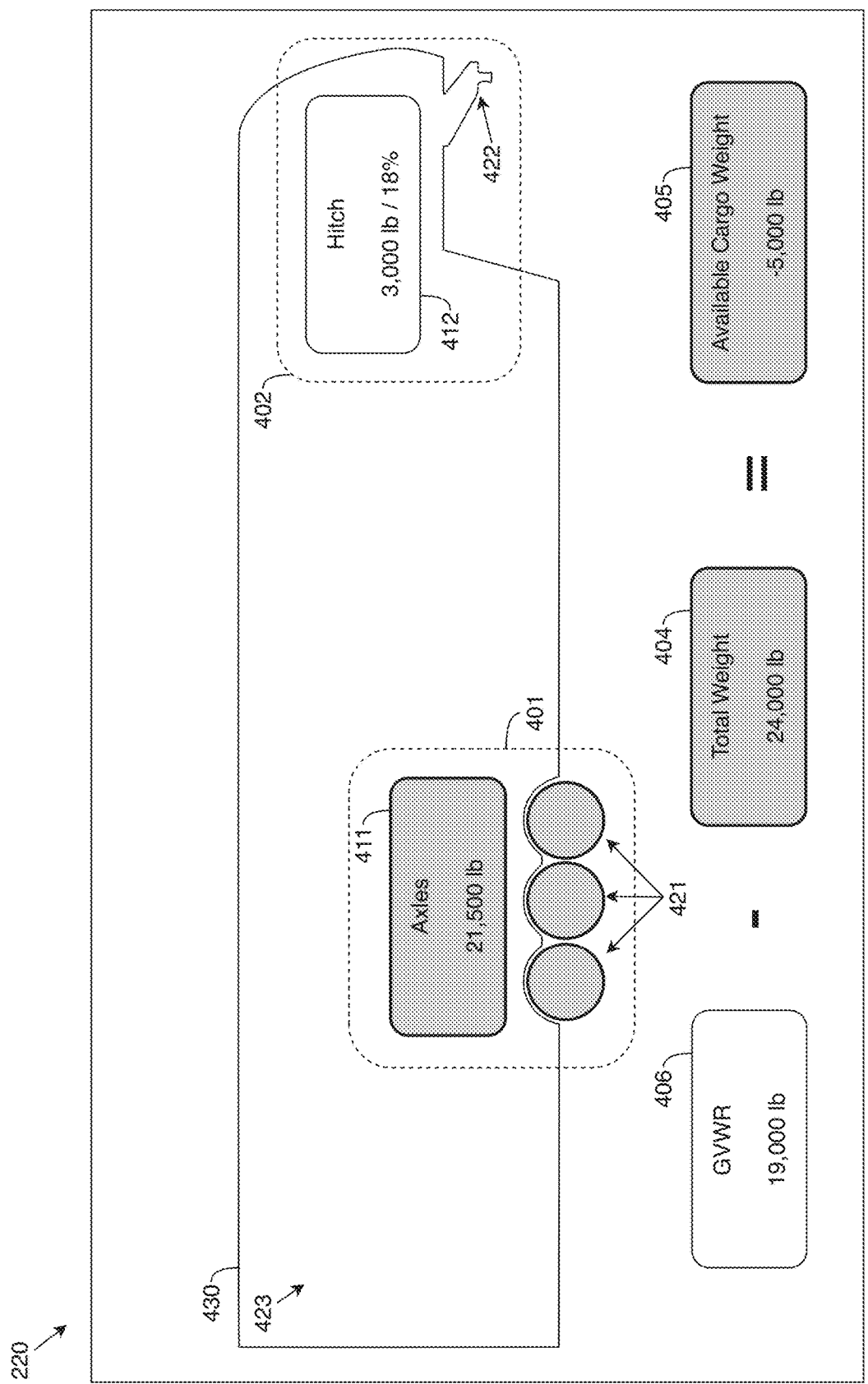
FIGS. 6a-6d depict examples of excess weight alerts presented at a weight sensing system user interface, in accordance with one or more embodiments illustrated and described herein.

FIG. 6a depicts an example of excess weight alerts presented at a user interface, in accordance with one or more embodiments illustrated and described herein. As shown in FIG. 6a, axle-specific vehicle weight display element 401 accommodates a visual overlay of an axle-specific vehicle weight $W_A$ of 21,500 lb. Hitch-specific weight display element 402 accommodates a visual overlay of a hitch-specific vehicle weight $W_H$ of 3,000 lb and a hitch-specific weight percentage $W_H\%$ of 18%. Total weight display element 404 accommodates a visual overlay of total weight W of 24,000 lb. Available cargo weight display element 405 accommodates a visual overlay of an available cargo weight $W_{\hat{C}}$ of −5,000 lb. GVWR display element 406 accommodates a visual overlay of a GVWR of 19,000 lb. In the embodiment of FIG. 6a, the GAWR of trailed vehicle 100 is 18,000 lb, axle-specific reference weight $W_{RA}$ is the GAWR of the trailed vehicle, and an acceptable relative weight range at hitch assembly 106 is 15%-25%.

In the embodiment of FIG. 6a, excess axle-specific vehicle weight alert 501 is triggered because axle-specific vehicle weight determination 301 is above axle-specific reference weight $W_{RA}$ (which is the GAWR of trailed vehicle 100 in this example), and excess total weight alert 504 is triggered because total weight determination 304 is above the GVWR of trailed vehicle 100. Specifically, axle-specific vehicle weight $W_A$=21,500 lb is above $W_{RA}$=GAWR=18,000 lb, and total weight W=24,000 lb is above GVWR=19,000 lb. Additionally, excess cargo weight alert 505 is triggered because available cargo weight $W_{\hat{C}}$ is at or below zero—specifically, $W_{\hat{C}}$=−5,000 lb is below zero.

In the illustrated embodiment, axle-specific vehicle weight display element 401 accommodates a visual overlay of both axle-specific vehicle weight $W_A$ and excess axle-specific vehicle weight alert 501. For the purpose of illustration, the excess axle-specific vehicle weight alert 501 is represented by shading within display element 411 and within wheeled axle assembly representation 421 of axle-specific vehicle weight display element 401, and further represented by heavy lines at the respective borders of display element 411 and wheeled axle assembly representation 421. Also, total weight display element 404 accommodates a visual overlay of both total weight W and excess total weight alert 504, and available cargo weight display element 405 accommodates a visual overlay of available cargo weight $W_{\hat{C}}$ and excess cargo weight alert 505. Excess total weight alert 504 and excess cargo weight alert 505 are represented by shading within total weight display element 404 and available cargo weight display element 405, respectively, and are further represented by heavy lines at the borders of total weight display element 404 and available cargo weight display element 405 (again respectively).

Note that, in the embodiment of FIG. 6a, excess hitch-specific weight percentage alert 503 is not triggered because hitch-specific weight percentage determination 303 is neither above nor below an acceptable relative weight range at hitch assembly 106: $W_{H\,\%}$=18% is neither above 25% nor below 15%. Though hitch-specific weight display element 402 may accommodate a visual overlay of excess hitch-specific weight percentage alert 503 (in addition to hitch-specific vehicle weight $W_H$ and hitch-specific weight percentage $W_H$%), no such visual overlay is present in the embodiment of FIG. 6a since excess hitch-specific weight percentage alert 503 is not triggered.

Figure 6B:
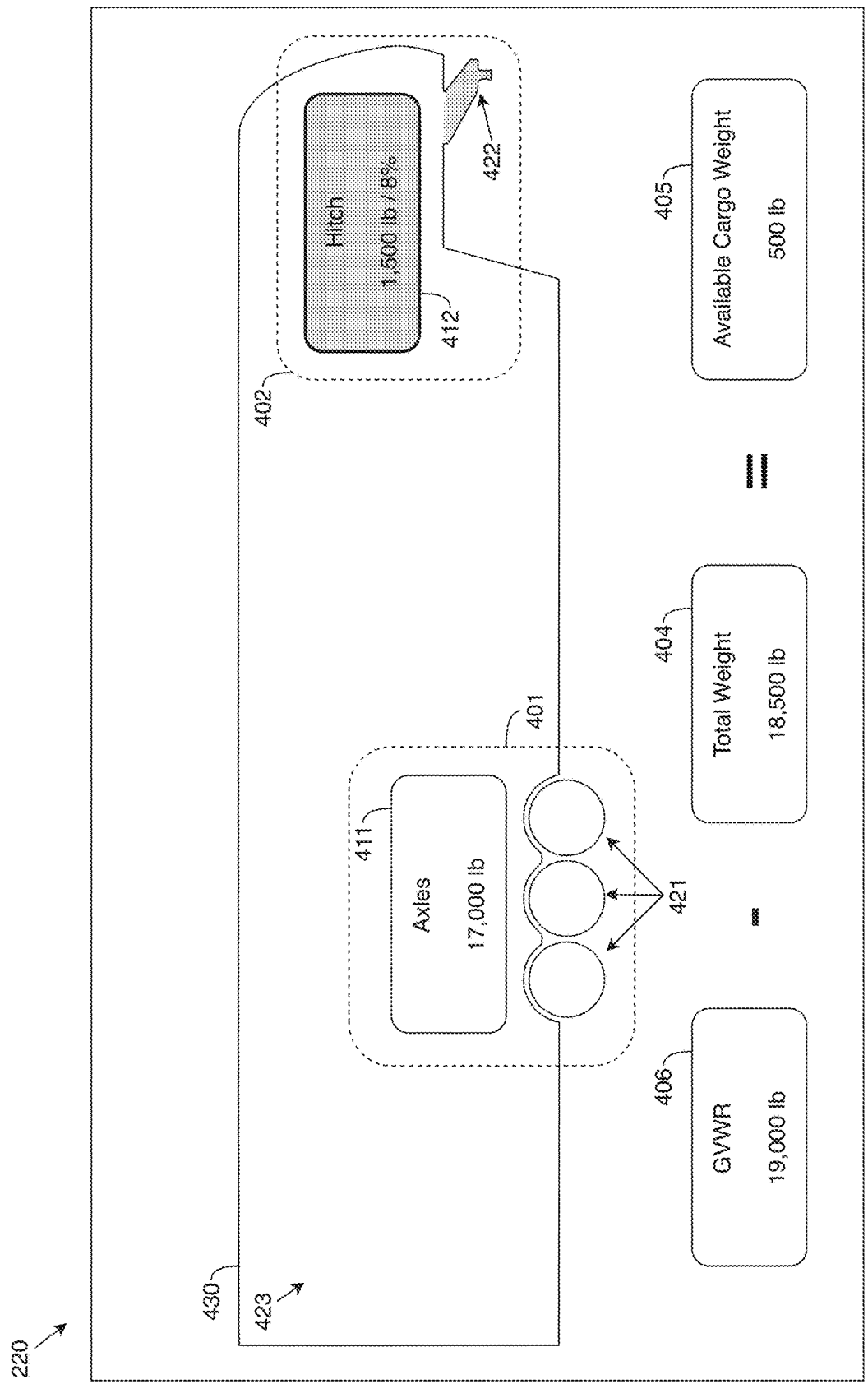

FIG. 6b depicts another example of excess weight alerts presented at a user interface, in accordance with one or more embodiments illustrated and described herein. As shown in FIG. 6b, axle-specific vehicle weight display element 401 accommodates a visual overlay of an axle-specific vehicle weight $W_A$ of 17,000 lb. Hitch-specific weight display element 402 accommodates a visual overlay of a hitch-specific vehicle weight $W_H$ of 1,500 lb and a hitch-specific weight percentage $W_H$% of 8%. Additionally, total weight display element 404 accommodates a visual overlay of total weight W of 18,500 lb, and available cargo weight display element 405 accommodates a visual overlay of an available cargo weight $W_{\hat{C}}$ of 500 lb. As in FIG. 6a, GVWR display element 406 accommodates a visual overlay of a GVWR of 19,000 lb, axle-specific reference weight $W_{RA}$ is 18,000 lb, and an acceptable relative weight range at hitch assembly 106 is 15%-25%.

In the embodiment of FIG. 6b, excess hitch-specific weight percentage alert 503 is triggered because hitch-specific weight percentage determination 303 (8% in this example) is below the acceptable relative weight range at hitch assembly 106. Specifically, hitch-specific weight percentage $W_{H\,\%}$=8% is below the acceptable relative weight range of 15%-25%. Hitch-specific weight display element 402 accommodates a visual overlay of hitch-specific vehicle weight $W_H$, hitch-specific weight percentage $W_{H\,\%}$, and excess hitch-specific weight percentage alert 503. The excess hitch-specific weight percentage alert 503 is represented by shading within display element 412 and within hitch assembly representation 422, and further represented by a heavy line at the border of display element 412.

In this example, excess axle-specific vehicle weight alert 501 is not triggered because axle-specific vehicle weight determination 301 is not above axle-specific reference weight $W_{RA}$, nor is excess total weight alert 504 triggered because total weight determination 304 is not above the GVWR of the trailed vehicle. Specifically, axle-specific vehicle weight $W_A$=17,000 lb is not above $W_{RA}$=GAWR=18,000 lb, and total weight W=18,500 lb is not above GVWR=19,000 lb. Further, excess cargo weight alert 505 is not triggered because available cargo weight $W_{\hat{C}}$ is not at or below zero—that is, available cargo weight $W_{\hat{C}}$=500 lb is not at or below zero.

A given excess weight alert may take the form of (or include) a visual color change in a given display element of user interface 220. For instance, in the embodiment of FIG. 6a, excess axle-specific vehicle weight alert 501 comprises a visual color change in axle-specific vehicle weight display element 401, as represented by the shading and heavy lines described above. The visual color change in axle-specific vehicle weight display element 401 may include a visual color change in wheeled axle assembly representation 421, in display element 411, or both as shown in FIG. 6a. Similarly, excess total weight alert 504 may comprise a visual color change in total weight display element 404, and excess cargo weight alert 505 may comprise a visual color change in available cargo weight display element 405, as represented by the shading and heavy lines in FIG. 6a. In the embodiment of FIG. 6b, excess hitch-specific weight percentage alert 503 comprises a visual color change in hitch-specific weight display element 402, which may include a visual color change in hitch assembly representation 422, display element 412, or both as represented by the shading and heavy lines in FIG. 6b.

The visual color changes depicted in FIGS. 6a and 6b could include visual color changes (in the respective display elements) to the color red—a color that may be understood to convey significance or urgency—though visual color changes to other colors are possible as well.

As another possibility, a given excess weight alert may take the form of (or include) an excess weight popup presented at user interface 220—for instance, presented centrally at the user interface.

Figure 6C:
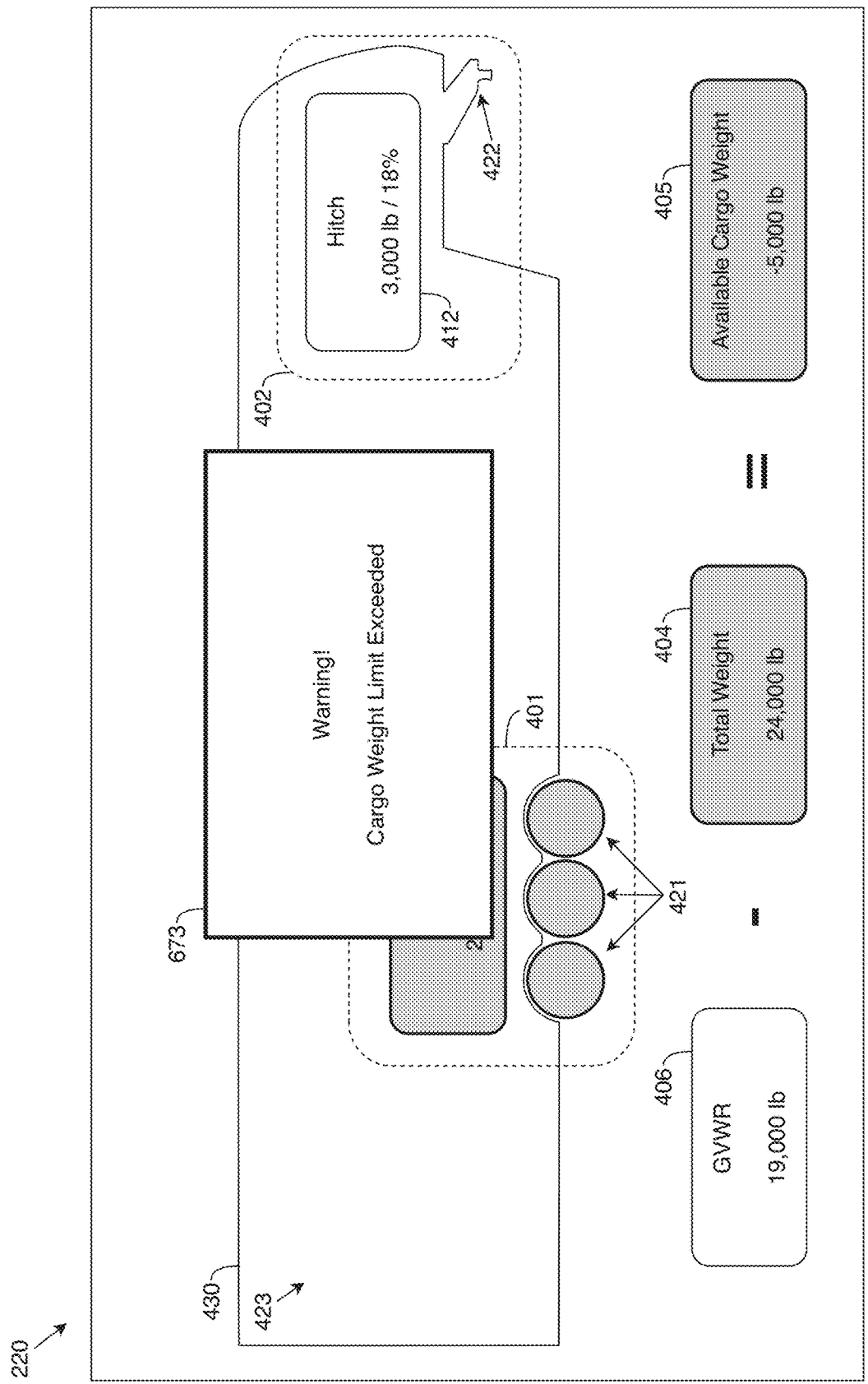
Figure 6D:
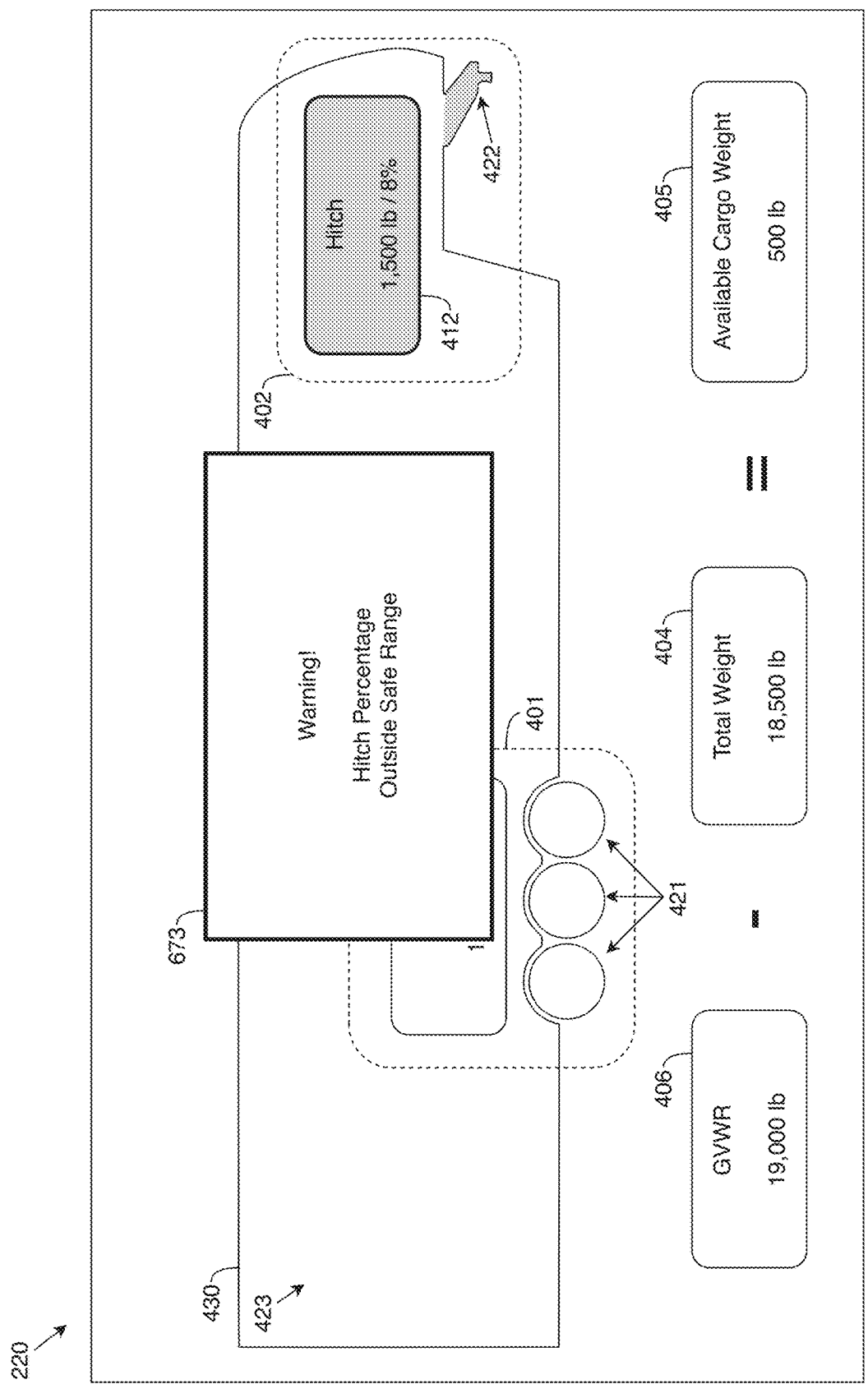

FIGS. 6c and 6d depict examples of excess weight popups at a user interface, according to one or more embodiments illustrated and described herein. As shown, user interface 220 includes a popup window display element 673, and further includes the display elements that are also shown in FIGS. 6a and 6b. The display elements of FIGS. 6c and 6d accommodate visual overlays of the same weights as those in the embodiments of FIGS. 6a and 6b, respectively. Popup window display element 673 is at a central position of user interface 220, though it will be appreciated that the popup window display element could be positioned elsewhere without departing from the scope of the disclosure.

The popup window display element may accommodate a visual overlay of an excess weight alert. For instance, prior to a given excess weight popup, user interface 220 may not have included popup window display element 673, and the excess weight popup could include an addition of popup window display element 673 to the user interface (e.g., a presentation of the popup window display element 673 at the user interface).

A particular example of an excess weight popup is described with reference to the embodiment of FIG. 6c, in which excess cargo weight alert 505 is triggered because available cargo weight $W_{\bar{C}}$=−5,000 lb is below zero. In this example, excess cargo weight alert 505 includes an excess cargo weight popup, and popup window display element 673 accommodates a visual overlay of the excess cargo weight popup. More particularly, the excess cargo weight popup includes an excess cargo weight alert description, and as shown, the visual overlay of the excess cargo weight popup includes a visual overlay of the excess cargo weight alert description. The excess cargo weight alert description includes a display of "Warning! Cargo Weight Limit Exceeded", though other examples are possible as well.

Another example of an excess weight popup is described with reference to the embodiment of FIG. 6d, in which excess hitch-specific weight percentage alert 503 is triggered because hitch-specific weight percentage $W_{H\ \%}$=8% is below the acceptable relative weight range of 15%-25% in the embodiment. According to this example, excess hitch-specific weight percentage alert 503 includes an excess hitch-specific weight percentage popup, and popup window display element 673 accommodates a visual overlay of the excess hitch-specific weight percentage popup. The excess hitch-specific weight percentage popup in turn includes an excess hitch-specific weight percentage alert description, and as shown in FIG. 6d, the visual overlay of the excess hitch-specific weight percentage popup includes a visual overlay of the excess hitch-specific weight percentage alert description. The excess hitch-specific weight percentage alert description in this example includes a display of "Warning! Hitch Percentage Outside Safe Range", though other examples are possible as well without departing from the scope of the disclosure.

A visual overlay of an excess weight popup could include a visual overlay of a mask covering user interface 220 outside of popup window display element 673. The mask could include a semi-transparent mask or an opaque mask, and may result in a visual color change of user interface 220 outside of popup window display element 673, such as a chrominance change, a luminance change, or both, among other possibilities. For example, the visual color change may include a chrominance change and/or a luminance change that results in a visual darkening of user interface 220 outside of popup window display element 673.

In an embodiment, weight processing module 210 cooperates with user interface 220 to display definitional data associated with one or more display elements of the user interface, in response to a user query at the user interface.

Figure 7:
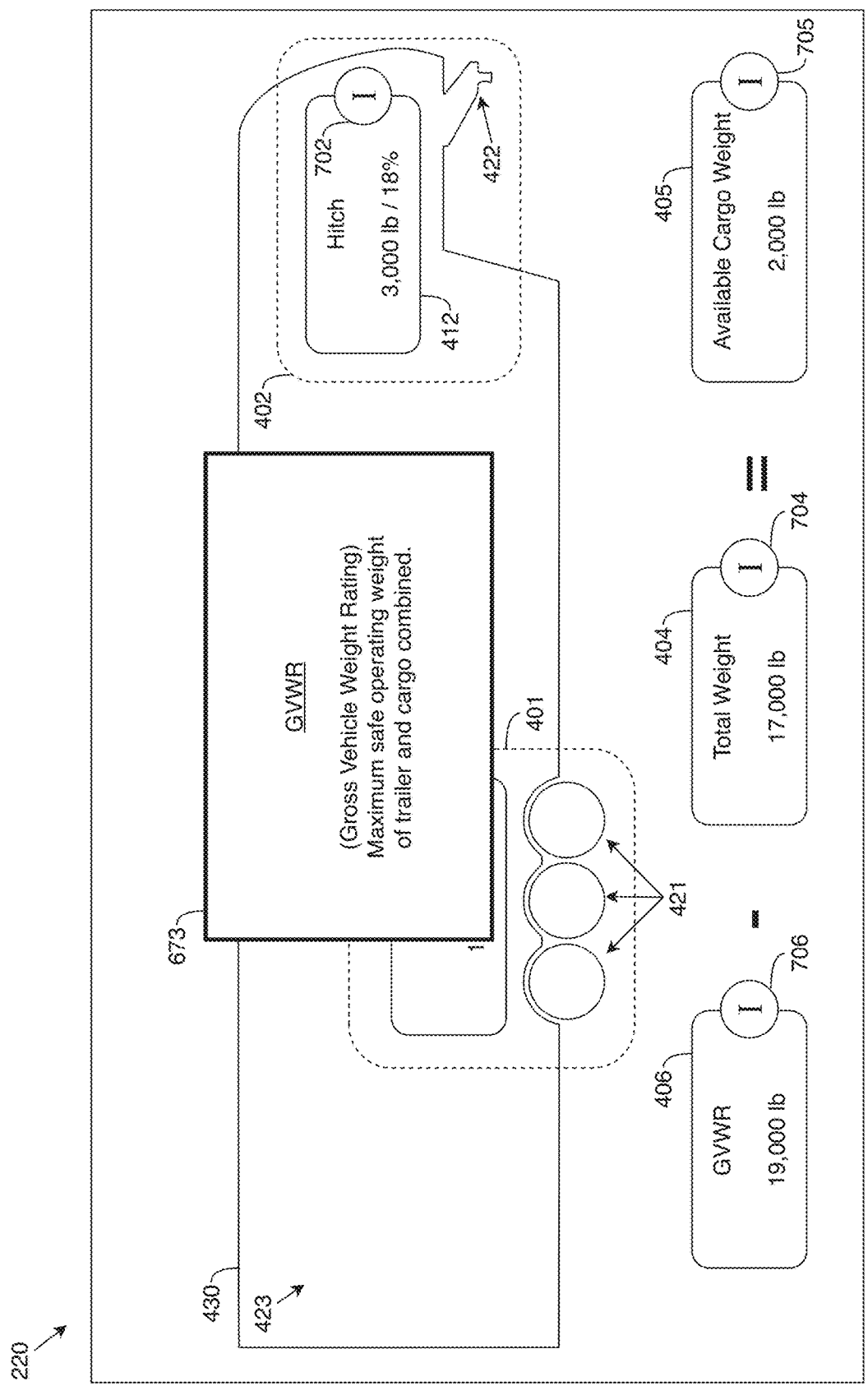
FIG. 7 depicts an example of a definitional data display, in accordance with one or more embodiments illustrated and described herein.

FIG. 7 depicts an example of a definitional data display, in accordance with one or more embodiments illustrated and described herein. As shown, user interface 220 includes the display elements described with reference to FIG. 4, as well as popup window display element 673 described with reference to FIGS. 6c and 6d. In an embodiment described with reference to FIG. 7, weight processing module 210 cooperates with user interface 220 to display definitional data associated with GVWR display element 406. The definitional data in this example reads "GVWR (Gross Vehicle Weight Rating) Maximum safe operating weight of trailer and cargo combined", overlaid on popup window display element 673.

Weight processing module 210 may display definitional data associated with a given display element in response to a user query at user interface 220. For instance, the given display element could include a definition request display element, and the user query at user interface 220 could take the form of (or include) user interaction with the definition request display element. That is, the weight processing module could display the definitional data associated with the given display element in response to user interaction with the definition request display element of the given display element. The user interaction could take the form of, for example, a finger press on the definition request display element presented at the user interface (e.g., if the user interface includes a touchscreen display), though other forms of user interaction are possible as well without departing from the scope of the disclosure.

To illustrate, as shown in FIG. 7, GVWR display element 406 includes a definition request display element 706, in the form of a circular display element that includes the capital letter "I" (indicating "information", for example). Weight processing module may display definitional data associated with GVWR display element 406 in response to user interaction with definition request display element 706. The user interaction could take the form of a finger press on definition request display element 706.

A definitional data display by weight processing module 210 may include an overlay of the definitional data display on a display element of user interface 220. For instance, popup window display element 673 shown in FIG. 7 may accommodate an overlay of the display of the definitional data (such as the definitional data associated with GVWR display element 406 as illustrated). Similar to the excess weight alerts described above, prior to a given definitional data display, user interface 220 may not have included popup window display element 673. and the display of the definitional data by weight processing module 210 may include an addition of popup window display element 673 to the user interface (e.g., a presentation of the popup window display element 673 at the user interface).

Other examples of definitional data (and displays of definitional data) are possible as well. For instance, weight processing module 210 may cooperate with user interface 220 to display definitional data associated with axle-specific vehicle weight display element 401, in response to a user query at the user interface. Though not shown in FIG. 7, axle-specific vehicle weight display element 401 could include a respective definition request display element, and weight processing module 210 may display definitional data associated with axle-specific vehicle weight display element 401 in response to user interaction with the respective definition request display element. The definitional data associated with axle-specific vehicle weight display element 401 could read "Axles: Total weight above axles", among other examples.

As another example, weight processing module 210 may cooperate with user interface 220 to display definitional data associated with hitch-specific weight display element 402, in response to a user query at the user interface. As shown in FIG. 7, hitch-specific weight display element 402 could include a definition request display element 702, and weight processing module 210 may display definitional data associated with hitch-specific weight display element 402 in response to user interaction with definition request display element 702. The definitional data associated with hitch-specific weight display element 402 could read "Hitch: Percentage of empty trailer's gross weight at hitch. Safe towing range must be within 15%-25%". Other examples are possible as well.

Weight processing module 210 may cooperate with user interface 220 to display definitional data associated with total weight display element 404, in response to a user query at user interface 220. As further shown in FIG. 7, total weight display element 404 could include a definition request display element 704, and weight processing module 210 may display definitional data associated with total weight display element 404 in response to user interaction with definition request display element 704. The definitional data associated with total weight display element 404 could read (for example) "Total: Total weight of trailer and cargo above trailer's axle(s) and hitch". Other variations are possible as well without departing from the scope of the disclosure.

As another possibility, weight processing module 210 may cooperate with user interface 220 to display definitional data associated with available cargo weight display element 405, in response to a user query at the user interface. Available cargo weight display element 405 could include a definition request display element 705, as depicted in FIG. 7, and weight processing module 210 may display definitional data associated with available cargo weight display element 405 in response to user interaction with definition request display element 705. The definitional data associated with available cargo weight display element 405 could read (for example) "Available Cargo: Current under/over weight of trailer's GVWR". Numerous other possibilities exist as well.

As mentioned previously, user interface 220 (such as one or more components of the user interface) could be mounted to the trailed vehicle 100. However, user interface 220 need not be mounted to trailed vehicle 100, and in some embodiments, the user interface 220 could take the form of a mobile device user interface (among other possibilities).

Figure 8:
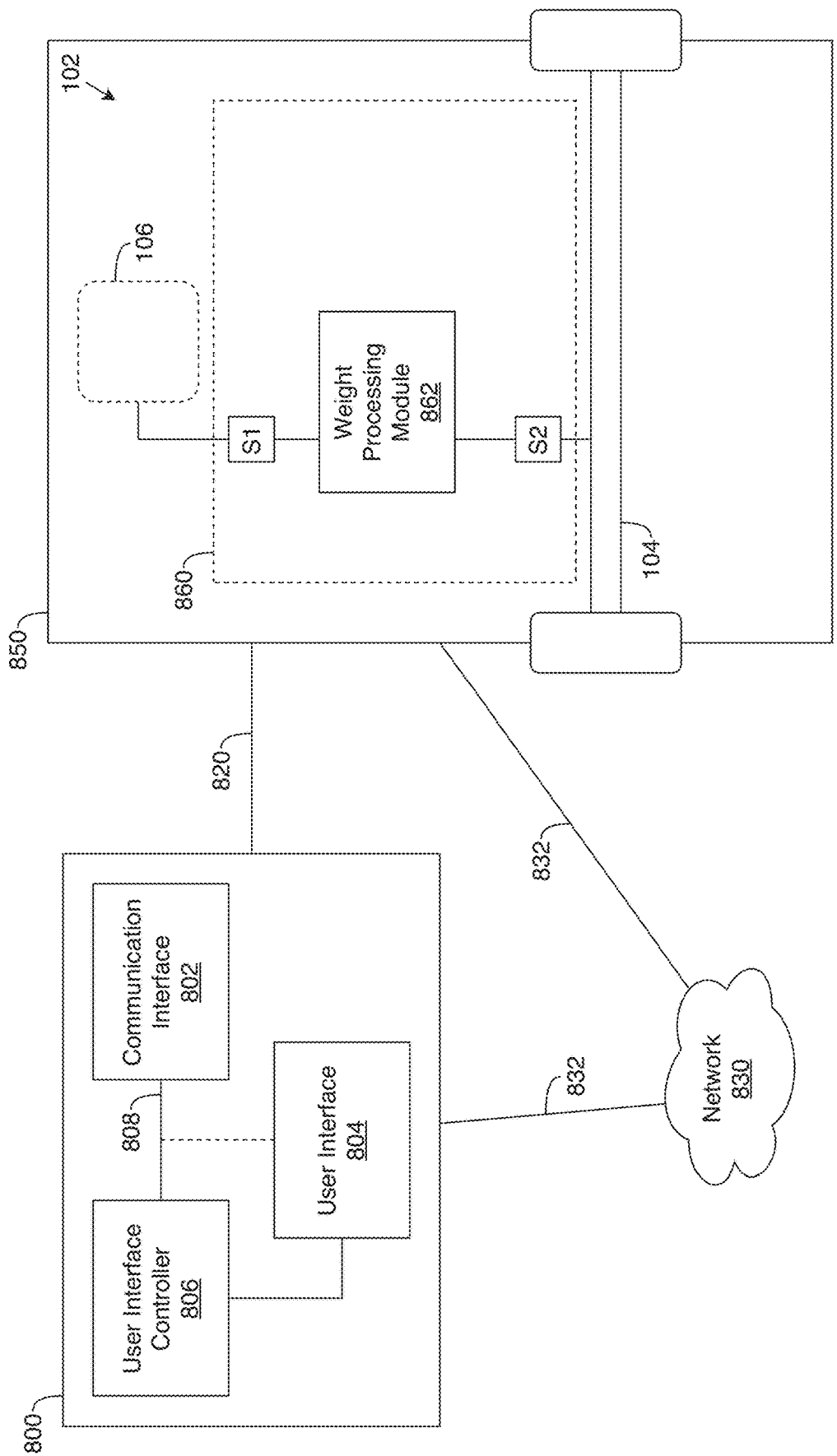
FIG. 8 depicts a mobile device, according to one or more embodiments illustrated and described herein.

FIG. 8 depicts a mobile device, according to one or more embodiments illustrated and described herein. A mobile device 800 includes a communication interface 802, a user interface 804, and a user interface controller 806. The mobile device could take the form of (or include) a smartphone, a tablet computer, a smartwatch, a head-mounted display, a handheld computer, a wearable computer, or any other mobile device. As shown, mobile device 800 (e.g., communication interface 802 of the mobile device) may be communicatively coupled to a trailed vehicle 850—for instance, over a network 830 via one or more network communication links 832, and/or over a local communication link 820.

Network 830 may include one or more computing systems and network infrastructure configured to facilitate communication between mobile device 800 and trailed vehicle 850. The network may take the form of (or include) one or more wireless networks, cellular networks, personal area networks (PANs), wide area networks (WANs), local area networks (LANs), the Internet, or any combination of these or other networks. Network 830 may operate according to one or more communication protocols such as Wi-Fi, Long-Term Evolution (LTE), Bluetooth, Zigbee, Z-Wave, nearfield communication (NFC), Ethernet, IP, TCP, Universal Serial Bus (USB), IEEE 1394 (Fire Wire), or any combination of these or other protocols, as examples. Though network 830 is shown as a single network, it should be understood that the network may include multiple, distinct networks that are communicatively linked. Network 830 could take other forms as well.

Network communication links 832 may communicatively connect mobile device and/or trailed vehicle 850 to network 108 to facilitate communication between these or other entities communicatively connected to the network. Any of network communication links 832 could include wireless and/or wired communication links, and could include a combination of hardware and/or software, perhaps operating on one or more communication-link layers such as one or more physical, network, transport, and/or application layers. Network communication links 832 may include one or more intermediate paths or systems, for example.

Local communication link 820 may facilitate communication between mobile device 800 and trailed vehicle 850, and could include a wireless and/or wired link. In an embodiment, local communication link 820 facilitates direct communication between mobile device 800 and trailed vehicle 850, and the local communication link does not include any intermediate systems, networks, or paths except for those that may be part of the mobile device or the trailed vehicle. The local communication link may facilitate communication via a short-range communication protocol, which may include wireless protocols such as Bluetooth, Wi-Fi, NFC, ZigBee, or Z-Wave (as examples), wired protocols such as Universal USB or FireWire (among other possibilities), or a combination of these. It should be understood that local communication link 820 could take other forms as well, including a form similar to any of network communication links 832.

Trailed vehicle 850 takes a form similar to trailed vehicle 100 described previously. More particularly, trailed vehicle 850 includes cargo area 102, wheeled axle assembly 104 supporting the cargo area, hitch assembly 106 configured to secure trailed vehicle 850 to a tow vehicle, and a weight sensing system 860. An axle-specific reference weight and a hitch-specific reference weight described with reference to trailed vehicle 850 take a form similar to the axle-specific reference weight the hitch-specific reference weight and the described with reference to trailed vehicle 100. For instance, the axle-specific reference weight could take the form of a GAWR and/or a GVWR of trailed vehicle 850, and the hitch-specific reference weight could take the form of a total weight of trailed vehicle 850, a pre-loaded weight of trailed vehicle 850, and/or an axle-specific vehicle weight of trailed vehicle 850. Weight sensing system 860 includes a weight processing module 862, and includes weight sensing components S1 and S2 that are associated with wheeled axle assembly 104 and hitch assembly 106 and that are communicatively coupled to the weight processing module.

Weight sensing system 860 also takes a form similar to weight sensing system 110, except that a user interface could be absent from weight sensing system 860 of trailed vehicle 850, and that the display operations executed by weight processing module 210 may be absent from operations executed by weight processing module 862. The weight determination operations executed by weight processing module 210 are also executed by weight processing module 862, as will be described in additional detail below—these operations are referred to as vehicle weight determinations executed by weight processing module 862).

Referring again to mobile device 800, communication interface 802 of mobile device 800 may implement vehicle weight acquisition of vehicle weight determinations executed by weight processing module 862 of trailed vehicle 850. User interface 804 could take a form similar to user interface 220 of weight sensing system 860 of trailed vehicle 100—for example, similar except that user interface 804 is not mounted to trailed vehicle 850, or similar except that user interface 804 is a mobile device. As with user interface 220, user interface 804 may include axle-specific vehicle weight display element 401, hitch-specific weight display element 402, total weight display element 404, available cargo weight display element 405, GVWR display element 406, and/or vehicle representation 430, among other possibilities. User interface controller 806 comprises a processor and non-transitory computer readable storage having instructions that, when executed by the processor, cause the user interface controller to cooperate with communication interface 802 and user interface 804 to execute user interface controller operations. Additional details for each of these are provided below.

Figure 9:
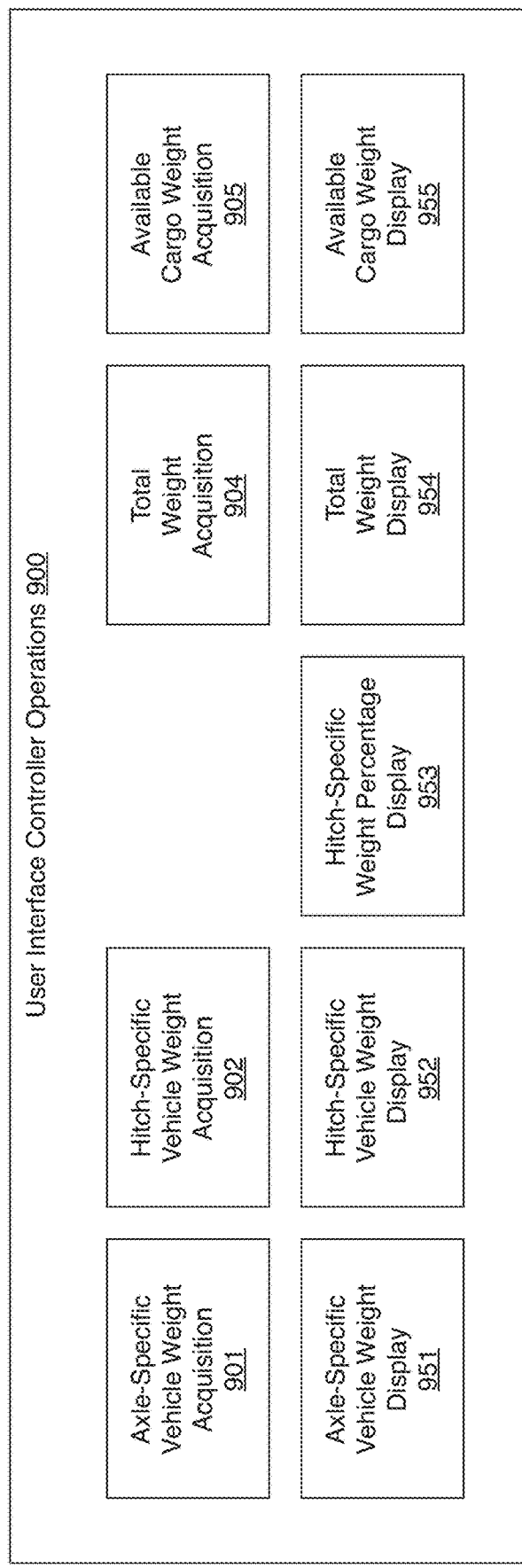
FIG. 9 depicts user interface controller operations executed by a user interface controller, in accordance with one or more embodiments illustrated and described herein.

FIG. 9 depicts user interface controller operations executed by a user interface controller, in accordance with one or more embodiments illustrated and described herein. As shown, user interface controller operations 900 executed by user interface controller 806 comprise an axle-specific vehicle weight ($W_A$) acquisition 901 via communication interface 802, a hitch-specific vehicle weight ($W_H$) acquisition 902 via communication interface 802, a total weight (W) acquisition 904 via communication interface 802, and an available cargo weight ($W_C$) acquisition 905 via communication interface 802. Total weight acquisition 904 represents a combination comprising at least the axle-specific vehicle weight and the hitch-specific vehicle weight, and available cargo weight acquisition 905 represents a difference between the GVWR of trailed vehicle 850 and the total weight.

The vehicle weight acquisition of the vehicle weight determinations executed by weight processing module 862 may include acquisition of one or more of the vehicle weight determinations via communication interface 802. As noted previously, the vehicle weight determinations executed by weight processing module 862 may include any one or more of axle-specific vehicle weight determination 301, hitch-specific vehicle weight determination 302, hitch-specific weight percentage determination 303, total weight determination 304, and available cargo weight determination 305. Accordingly, axle-specific vehicle weight acquisition 901 could include an acquisition (via communication interface 802) of axle-specific vehicle weight determination 301 executed by weight processing module 862 of trailed vehicle 850. Also, hitch-specific vehicle weight acquisition 902 may include an acquisition (via communication interface 802) of hitch-specific vehicle weight determination 302 executed by weight processing module 862 of trailed vehicle 850. Additionally, total weight acquisition 904 may include an acquisition (via communication interface 802) of total weight determination 304 executed by weight processing module 862 of trailed vehicle 850, and available cargo weight acquisition 905 may include an acquisition (via communication interface 802) of available cargo weight determination 305 executed by weight processing module 862 of trailed vehicle 850.

Though not specifically shown, user interface controller operations 900 may further include a hitch-specific weight percentage ($W_H$ %) acquisition that represents the hitch-specific vehicle weight in relation to a hitch-specific reference weight. In an embodiment, the hitch-specific weight percentage acquisition comprises an acquisition of the hitch-specific weight percentage via communication interface 802. For instance, the vehicle weight determinations executed by weight processing module 862 may include hitch-specific weight percentage determination 303, and the hitch-specific weight percentage acquisition may include acquisition—via communication interface 802—of hitch-specific weight percentage determination 303. In another embodiment, the hitch-specific weight percentage acquisition takes the form of (or includes) a hitch-specific weight percentage ($W_H$ %) determination executed by user interface controller 806. In this embodiment, the hitch-specific weight percentage determination represents the hitch-specific vehicle weight of hitch-specific vehicle weight acquisition 902 via communication interface 802, in relation to a hitch-specific reference weight. For instance, the hitch-specific weight percentage determination executed by user interface controller 806 may include a determination of a relation of the hitch-specific vehicle weight to the hitch-specific reference weight.

As also shown in FIG. 9, user interface controller operations 900 executed by user interface controller 806 further comprises an axle-specific vehicle weight display 951 at the user interface, a hitch-specific vehicle weight display 952 at the user interface, a hitch-specific weight percentage display 953 at the user interface, a total weight display 954 at the user interface, and an available cargo weight display 955 at the user interface—which may take a form similar (or identical) to axle-specific vehicle weight display 351, hitch-specific vehicle weight display 352, hitch-specific weight percentage display 353, total weight display 354, and available cargo weight display 355, respectively. For instance, axle-specific vehicle weight display 951 may comprise excess axle-specific vehicle weight alert 501 that is triggered when axle-specific vehicle weight acquisition 901 is above the axle-specific reference weight. Additionally, hitch-specific weight percentage display 953 may comprise excess hitch-specific weight percentage alert 503 that is triggered when the hitch-specific weight percentage acquisition (described above) is above or below an acceptable relative weight range at hitch assembly 106; hitch-specific weight percentage display 953 may include the hitch-specific weight percentage acquisition. Also, total weight display 954 may comprise excess total weight alert 504 that is triggered when total weight acquisition 904 is above the GVWR of trailed vehicle 850, and available cargo weight display 955 may comprise excess cargo weight alert 505 that is triggered when available cargo weight acquisition 905 is at or below zero.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A trailed vehicle comprising a cargo area, a wheeled axle assembly supporting the cargo area, a hitch assembly configured to secure the trailed vehicle to a tow vehicle, and a weight sensing system, wherein:
   the weight sensing system comprises weight sensing components associated with the wheeled axle assembly and the hitch assembly, a weight processing module communicatively coupled to the weight-sensing components, and a user interface;
   the weight processing module comprises a processor and non-transitory computer readable storage, the non-transitory computer readable storage comprising instructions that, when executed by the processor, cause the weight processing module to cooperate with the weight sensing components and the user interface to execute weight determination and display operations;
   the weight determination and display operations executed by the weight processing module comprise
      an axle-specific vehicle weight determination,
      an axle-specific vehicle weight display element presented at the user interface,
      a hitch-specific vehicle weight determination,
      a hitch-specific vehicle weight display element presented at the user interface,
      a hitch-specific weight percentage determination,
      a hitch-specific weight percentage display element presented at the user interface,
      a total weight determination,
      a total weight display element presented at the user interface,
      an available cargo weight determination, and
      an available cargo weight display element presented at the user interface;
   the axle-specific vehicle weight display element comprises an excess axle-specific vehicle weight alert that is triggered when the axle-specific vehicle weight determination is above an axle-specific reference weight;
   the axle-specific vehicle weight display element accommodates a visual overlay of the axle-specific vehicle weight and the excess axle-specific vehicle weight alert;
   the hitch-specific weight percentage determination represents the hitch-specific vehicle weight in relation to a hitch-specific reference weight, and the hitch-specific weight percentage display element comprises an excess hitch-specific weight percentage alert that is triggered when the hitch-specific weight percentage determination is above or below an acceptable relative weight range at the hitch assembly;
   the hitch-specific weight display element accommodates a visual overlay of the hitch-specific vehicle weight, the hitch-specific weight percentage, and the excess hitch-specific weight percentage alert;
   the total weight determination represents a combination comprising at least the hitch-specific vehicle weight and the axle-specific vehicle weight, and the total weight display element comprises an excess total weight alert that is triggered when the total weight determination is above a GVWR of the trailed vehicle;
   the total weight display element accommodates a visual overlay of the total weight and the excess total weight alert;
   the available cargo weight determination represents a difference between the GVWR of the trailed vehicle and the total weight, and the available cargo weight display element comprises an excess cargo weight alert that is triggered when the available cargo weight is at or below zero; and
   the available cargo weight display element accommodates a visual overlay of the available cargo weight and the excess cargo weight alert.

2. The trailed vehicle as claimed in claim 1 wherein the axle-specific reference weight is a GAWR of the trailed vehicle.

3. The trailed vehicle as claimed in claim 1 wherein the axle-specific reference weight is a GVWR of the trailed vehicle.

4. The trailed vehicle as claimed in claim 1 wherein the hitch-specific reference weight is a total weight of the trailed vehicle.

5. The trailed vehicle as claimed in claim 1 wherein the hitch-specific reference weight is an axle-specific vehicle weight of the trailed vehicle.

6. The trailed vehicle as claimed in claim 1 wherein the total weight determination represents a combination comprising at least the hitch-specific vehicle weight, the axle-specific vehicle weight, and an unsprung weight of the trailed vehicle.

7. The trailed vehicle as claimed in claim 1 wherein the excess axle-specific vehicle weight alert comprises a visual color change in the axle-specific vehicle weight display element of the user interface.

8. The trailed vehicle as claimed in claim 7 wherein the axle-specific vehicle weight display element comprises a wheeled axle assembly representation, and wherein the visual color change in the axle-specific vehicle weight display element comprises a visual color change in the wheeled axle assembly representation.

9. The trailed vehicle as claimed in claim 1 wherein the excess hitch-specific weight percentage alert comprises a visual color change in a hitch-specific weight display element of the user interface.

10. The trailed vehicle as claimed in claim 9 wherein the hitch-specific weight display element comprises a hitch assembly representation, and wherein the visual color change in the hitch-specific weight display element comprises a visual color change in the hitch assembly representation.

11. The trailed vehicle as claimed in claim 1 wherein the excess total weight alert comprises a visual color change in a total weight display element of the user interface.

12. The trailed vehicle as claimed in claim 1 wherein the excess cargo weight alert comprises a visual color change in an available cargo weight display element of the user interface.

13. The trailed vehicle as claimed in claim 1 wherein the weight processing module cooperates with the user interface to display definitional data associated with:
an axle-specific vehicle weight display element of the user interface, in response to a user query at the user interface;
a hitch-specific weight display element of the user interface, in response to a user query at the user interface;
a total weight display element of the user interface, in response to a user query at the user interface; and
an available cargo weight display element of the user interface, in response to a user query at the user interface.

14. A mobile device comprising a communication interface, a user interface, and a user interface controller, wherein:
the communication interface implements vehicle weight acquisition of vehicle weight determinations executed by a weight processing module of a trailed vehicle comprising a cargo area, a wheeled axle assembly supporting the cargo area, a hitch assembly configured to secure the trailed vehicle to a tow vehicle, and a weight sensing system including the weight processing module and weight sensing components that are associated with the wheeled axle assembly and the hitch assembly and that are communicatively coupled to the weight processing module;
the user interface controller comprises a processor and non-transitory computer readable storage having instructions that, when executed by the processor, cause the user interface controller to cooperate with the communication interface and the user interface to execute user interface controller operations;
the user interface controller operations executed by the user interface controller comprise:
an axle-specific vehicle weight acquisition via the communication interface,
an axle-specific vehicle weight display element at the user interface,
a hitch-specific vehicle weight acquisition via the communication interface,
a hitch-specific vehicle weight display element at the user interface,
a hitch-specific weight percentage display element at the user interface,
a total weight acquisition via the communication interface,
a total weight display element at the user interface,
an available cargo weight acquisition via the communication interface, and
an available cargo weight display element at the user interface;
the axle-specific vehicle weight display element comprises an excess axle-specific vehicle weight alert that is triggered when the axle-specific vehicle weight acquisition is above an axle-specific reference weight;
the axle-specific vehicle weight display element accommodates a visual overlay of the axle-specific vehicle weight and the excess axle-specific vehicle weight alert;
the hitch-specific weight percentage display element comprises both a hitch-specific weight percentage acquisition representing the hitch-specific vehicle weight in relation to a hitch-specific reference weight, and an excess hitch-specific weight percentage alert that is triggered when the hitch-specific weight percentage acquisition is above or below an acceptable relative weight range at the hitch assembly;
the hitch-specific weight percentage display element accommodates a visual overlay of the hitch-specific vehicle weight, the hitch-specific weight percentage, and the excess hitch-specific weight percentage alert;
the total weight acquisition represents a combination comprising at least the axle-specific vehicle weight and the hitch-specific vehicle weight, and the total weight display element comprises an excess total weight alert that is triggered when the total weight acquisition is above a GVWR of the trailed vehicle;
the total weight display element accommodates a visual overlay of the total weight and the excess total weight alert;
the available cargo weight acquisition represents a difference between the GVWR of the trailed vehicle and the total weight, and the available cargo weight display element comprises an excess cargo weight alert that is triggered when the available cargo weight acquisition is at or below zero; and
the available cargo weight display element accommodates a visual overlay of the available cargo weight and the excess cargo weight alert.

15. The mobile device as claimed in claim 14 wherein:
the vehicle weight determinations executed by the weight processing module comprise an axle-specific vehicle weight determination; and
the axle-specific vehicle weight acquisition comprises an acquisition of the axle-specific vehicle weight determination via the communication interface.

16. The mobile device as claimed in claim 14 wherein:
the vehicle weight determinations executed by the weight processing module comprise a hitch-specific vehicle weight determination; and
the hitch-specific vehicle weight acquisition comprises an acquisition of the hitch-specific vehicle weight determination via the communication interface.

17. The mobile device as claimed in claim 14 wherein:
the vehicle weight determinations executed by the weight processing module comprise a hitch-specific weight percentage determination; and
the hitch-specific weight percentage acquisition comprises an acquisition of the hitch-specific weight percentage determination via the communication interface.

18. The mobile device as claimed in claim 14 wherein:
the hitch-specific weight percentage acquisition comprises a hitch-specific weight percentage determination executed by the user interface controller;
the hitch-specific weight percentage determination comprises a determination of a relation of the hitch-specific vehicle weight of the hitch-specific vehicle weight acquisition to the GV WR of the trailed vehicle.

19. The mobile device as claimed in claim 14 wherein:
the vehicle weight determinations executed by the weight processing module comprise a total weight determination; and
the total weight acquisition comprises an acquisition of the total weight determination via the communication interface.

20. The trailed vehicle as claimed in claim 14 wherein:
the vehicle weight determinations executed by the weight processing module comprise an available cargo weight determination; and
the available cargo weight acquisition comprises an acquisition of the available cargo weight determination via the communication interface.

21. A trailed vehicle comprising a cargo area, a wheeled axle assembly supporting the cargo area, a hitch assembly configured to secure the trailed vehicle to a tow vehicle, and a weight sensing system, wherein:
the weight sensing system comprises weight sensing components associated with the wheeled axle assembly and the hitch assembly, a weight processing module communicatively coupled to the weight-sensing components, and a user interface;
the weight processing module comprises a processor and non-transitory computer readable storage, the non-transitory computer readable storage comprising instructions that, when executed by the processor, cause the weight processing module to cooperate with the weight sensing components and the user interface to execute weight determination and display operations;
the user interface comprises an axle-specific vehicle weight display element, a hitch-specific weight display element, a total weight display element, and an available cargo weight display element;
the weight determination and display operations executed by the weight processing module comprise an axle-specific vehicle weight determination, a hitch-specific vehicle weight determination, a hitch-specific weight percentage determination, a total weight determination, and an available cargo weight determination;
the weight determination and display operations executed by the weight processing module further comprise an axle-specific vehicle weight display presented at the user interface, a hitch-specific vehicle weight display presented at the user interface, a hitch-specific weight percentage display presented at the user interface, a total weight display presented at the user interface, and an available cargo weight display presented at the user interface;
the axle-specific vehicle weight display comprises an excess axle-specific vehicle weight alert that is triggered when the axle-specific vehicle weight determination is above an axle-specific reference weight, and the axle-specific vehicle weight display element accommodates a visual overlay of the axle-specific vehicle weight and the excess axle-specific vehicle weight alert;
the hitch-specific weight percentage determination represents the hitch-specific vehicle weight in relation to a hitch-specific reference weight, the hitch-specific weight percentage display comprises an excess hitch-specific weight percentage alert that is triggered when the hitch-specific weight percentage determination is above or below an acceptable relative weight range at the hitch assembly, and the hitch-specific weight display element accommodates a visual overlay of the hitch-specific vehicle weight, the hitch-specific weight percentage, and the excess hitch-specific vehicle weight alert;
the total weight determination represents a combination comprising at least the hitch-specific vehicle weight and the axle-specific vehicle weight, the total weight display comprises an excess total weight alert that is triggered when the total weight determination is above a GVWR of the trailed vehicle, and the total weight display element accommodates a visual overlay of the total weight and the excess total weight alert; and
the available cargo weight determination represents a difference between the GVWR of the trailed vehicle and the total weight, the available cargo weight display comprises an excess cargo weight alert that is triggered when the available cargo weight is at or below zero, and the available cargo weight display element accommodates a visual overlay of the available cargo weight and the excess cargo weight alert.

* * * * *

UNITED STATES PATENT AND TRADEMARK OFFICE
CERTIFICATE OF CORRECTION

PATENT NO.       : 11,440,556 B2
APPLICATION NO.  : 16/849367
DATED            : September 13, 2022
INVENTOR(S)      : Mark Bullock and Jon Brock It is certified that error appears in the above-identified patent and that said Letters Patent is hereby corrected as shown below:

In the Claims

In Column 22, Line(s) 58 & 59, Claim 18, after "relation", delete "of the hitch-specific vehicle weight of the hitch-specific vehicle weight" and insert --of the hitch-specific vehicle weight--, therefor.

In Column 22, Line(s) 60, Claim 18, delete "GV WR" and insert --GVWR--, therefor.

Signed and Sealed this
First Day of August, 2023

Katherine Kelly Vidal
*Director of the United States Patent and Trademark Office*